US010301007B2

(12) United States Patent
Lassen et al.

(10) Patent No.: US 10,301,007 B2
(45) Date of Patent: *May 28, 2019

(54) WING FOLD CONTROLLER

(71) Applicant: The Boeing Company, Chicago, IL (US)

(72) Inventors: Matthew August Lassen, Seattle, WA (US); Chad Richard Douglas, Shoreline, WA (US); Kelly Thomas Jones, Snohomish, WA (US); Terence Boyd Kenning, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 470 days.

This patent is subject to a terminal disclaimer.

(21) Appl. No.: 15/057,123

(22) Filed: Mar. 1, 2016

(65) Prior Publication Data

US 2016/0176504 A1    Jun. 23, 2016

Related U.S. Application Data

(63) Continuation of application No. 14/022,622, filed on Sep. 10, 2013, now Pat. No. 9,290,260, which is a
(Continued)

(51) Int. Cl.
*B64C 3/56* (2006.01)

(52) U.S. Cl.
CPC ............... *B64C 3/56* (2013.01); *Y02T 50/14* (2013.01); *Y02T 50/54* (2013.01)

(58) Field of Classification Search
CPC ........... B64C 3/56; B64C 23/065; B64C 5/08; B64C 5/12
(Continued)

(56) References Cited

U.S. PATENT DOCUMENTS 1,718,617 A    6/1929    Wagner
1,723,962 A    8/1929    Weymouth
(Continued)

FOREIGN PATENT DOCUMENTS

EP    1375342 A1    1/2004
EP    0988225 B1    10/2006
(Continued)

OTHER PUBLICATIONS

Notice of Allowance, dated Apr. 7, 2016, regarding U.S. Appl. No. 13/962,952, 12 pages.
(Continued)

*Primary Examiner* — Marc Burgess
(74) *Attorney, Agent, or Firm* — Yee & Associates, P.C.

(57) ABSTRACT

Illustrative embodiments may provide for an apparatus and method of controlling the folding of a wing. The apparatus may include a sensor, an actuator, and a wing fold controller. The method may include receiving a status of at least one of an aircraft and a wing fold system of the aircraft by the wing fold controller of the wing fold system. The method may also include receiving an automated command by the wing fold controller in response to receiving the status. The method may also include operating the wing fold system by the wing fold controller based on the automated command and the status. The method may also include transitioning a wingtip of a wing of the aircraft to one of a flight position and a folded position by an actuator of the wing fold system in response to commands from the wing fold controller.

20 Claims, 11 Drawing Sheets

Related U.S. Application Data continuation-in-part of application No. 13/664,416, filed on Oct. 30, 2012, which is a continuation-in-part of application No. 13/251,216, filed on Oct. 1, 2011, now Pat. No. 9,908,612.

(60) Provisional application No. 61/720,338, filed on Oct. 30, 2012.

(58) Field of Classification Search
USPC ... 244/49, 218, 39, 199.4, 124, 123.1, 123.8
See application file for complete search history.

(56) References Cited

U.S. PATENT DOCUMENTS

| | | | |
|---|---|---|---|
| 2,021,324 A | 11/1935 | Osborn | |
| 2,056,188 A | 10/1936 | Hayden | |
| 2,166,564 A | 7/1939 | Atwood et al. | |
| 2,280,809 A | 4/1942 | Evans | |
| 2,289,224 A | 7/1942 | Swanson et al. | |
| 2,290,850 A | 7/1942 | Umschweif | |
| 2,375,423 A | 5/1945 | Odilon | |
| 2,392,506 A | 1/1946 | Rosmann | |
| 2,444,332 A | 6/1948 | Briggs et al. | |
| 2,468,425 A | 4/1949 | Carpenter et al. | |
| 2,533,429 A | 12/1950 | Carpenter | |
| 2,674,422 A | 4/1954 | Pellarini | |
| 2,712,421 A | 7/1955 | Naumann | |
| 2,719,682 A | 10/1955 | Handel | |
| 2,876,677 A | 3/1959 | Clark et al. | |
| 3,081,053 A | 3/1963 | Jarrell | |
| 3,556,439 A | 1/1971 | Autry et al. | |
| 4,039,163 A | 8/1977 | Shorey | |
| 4,249,765 A | 2/1981 | Janssen | |
| 4,336,914 A | 6/1982 | Thomson | |
| 4,457,479 A | 7/1984 | Daude | |
| 4,824,053 A | 4/1989 | Sarh | |
| 4,858,857 A | 8/1989 | Lange et al. | |
| 5,002,521 A | 3/1991 | Schwarz et al. | |
| 5,042,855 A | 8/1991 | Bennett et al. | |
| 5,192,037 A | 3/1993 | Moorefield | |
| 5,201,479 A | 4/1993 | Renzelmann | |
| 5,310,138 A | 5/1994 | Fitzgibbon | |
| 5,350,135 A | 9/1994 | Renzelmann et al. | |
| 5,372,336 A | 12/1994 | Peaz | |
| 5,379,969 A | 1/1995 | Marx et al. | |
| 5,381,986 A | 1/1995 | Smith et al. | |
| 5,427,329 A | 6/1995 | Renzelmann et al. | |
| 5,452,643 A | 9/1995 | Smith et al. | |
| 5,492,288 A | 2/1996 | Bordelon | |
| 5,495,999 A | 3/1996 | Cymara | |
| 5,558,299 A | 9/1996 | Veile | |
| 5,593,113 A | 1/1997 | Cox | |
| 5,671,899 A | 9/1997 | Nicholas et al. | |
| 5,743,490 A | 4/1998 | Gillingham et al. | |
| 5,988,563 A | 11/1999 | Allen | |
| 6,032,418 A | 3/2000 | Larson | |
| 6,076,766 A | 6/2000 | Gruensfelder | |
| 6,089,502 A | 7/2000 | Herrick et al. | |
| 6,168,113 B1 | 1/2001 | Hann et al. | |
| 6,260,799 B1 | 7/2001 | Russ | |
| 6,273,369 B1 | 8/2001 | Nishimura | |
| 6,446,906 B1 | 9/2002 | Voigt et al. | |
| 6,834,835 B1 | 12/2004 | Knowles et al. | |
| 6,922,991 B2 | 8/2005 | Polcuch | |
| 7,275,722 B2 | 10/2007 | Irving et al. | |
| 7,445,180 B2 | 11/2008 | Plude et al. | |
| 7,637,454 B2 | 12/2009 | Pitt | |
| 7,744,038 B2 | 6/2010 | Sankrithi et al. | |
| 8,089,034 B2 | 1/2012 | Hammerquist | |
| 8,157,206 B2 | 4/2012 | Gionta et al. | |
| 8,336,830 B2 | 12/2012 | Eberhardt | |
| 8,342,447 B2 | 1/2013 | Etling | |
| 8,733,692 B2 | 5/2014 | Kordel et al. | |
| 9,290,260 B2 * | 3/2016 | Lassen | B64C 3/56 |
| 2002/0066825 A1 | 6/2002 | Miralles | |
| 2006/0284427 A1 | 12/2006 | Borycki | |
| 2007/0057120 A1 | 3/2007 | McConnell | |
| 2009/0045288 A1 | 2/2009 | Nakamura et al. | |
| 2009/0302151 A1 | 12/2009 | Holmes | |
| 2010/0084516 A1 | 4/2010 | Eberhardt | |
| 2011/0001016 A1 | 1/2011 | Skillen et al. | |
| 2011/0180657 A1 | 7/2011 | Gionta et al. | |
| 2012/0032023 A1 | 2/2012 | Bousfield et al. | |
| 2012/0085858 A1 | 4/2012 | Seifert | |
| 2012/0228424 A1 | 9/2012 | Parker | |
| 2013/0099060 A1 | 4/2013 | Dees et al. | |
| 2013/0146716 A1 | 6/2013 | Gettinger | |
| 2013/0292508 A1 | 11/2013 | Fox | |
| 2013/0313356 A1 | 11/2013 | Santini et al. | |
| 2013/0327883 A1 | 12/2013 | Kordel et al. | |
| 2014/0014768 A1 | 1/2014 | Lassen et al. | |
| 2014/0061371 A1 | 3/2014 | Good et al. | |
| 2014/0117150 A1 | 5/2014 | Good et al. | |
| 2014/0117151 A1 | 5/2014 | Fox et al. | |
| 2015/0014478 A1 | 1/2015 | Lassen et al. | |
| 2016/0083074 A1 | 3/2016 | Santini et al. | |

FOREIGN PATENT DOCUMENTS

| | | |
|---|---|---|
| EP | 2650212 A1 | 10/2013 |
| GB | 481050 A | 3/1938 |
| GB | 651436 A | 4/1951 |
| GB | 773739 A | 5/1957 |

OTHER PUBLICATIONS

Notice of Allowance, dated Jun. 8, 2016, regarding U.S. Appl. No. 13/966,754, 19 pages.
Notice of Allowance, dated Jul. 19, 2016, regarding U.S. Appl. No. 14/335,625, 20 pages.
European Patent Office Examination Report, dated May 15, 2017, regarding Application No. EP13169962.7, 4 pages.
Canadian Intellectual Property Office Examination Search Report, dated Sep. 27, 2017, regarding Application No. 2,828,726, 4 pages.
European Patent Office Examination Search Report, dated Nov. 30, 2017, regarding Application No. 13189783.7, 10 pages.
Canadian Intellectual Property Office Examination Search Report, dated Nov. 30, 2016, regarding Application No. 2,828,726, 5 pages.
Extended European Search Report, dated Jul. 21, 2015, regarding Application No. EP13190093.8, 6 pages.
Extended European Search Report, dated Jul. 24, 2015, regarding Application No. EP13189910.6, 6 pages.
Extended European Search Report, dated Jul. 24, 2015, regarding Application No. EP13190099.5, 5 pages.
Extended European Search Report, dated Jul. 27, 2015, regarding Application No. EP13189962.7, 7 pages.
Canadian Intellectual Property Office Examination Search Report, dated Aug. 3, 2015, regarding Application No. 2,825,073, 4 pages.
Canadian Intellectual Property Office Examination Search Report, dated Aug. 13, 2015, regarding Application No. 2,824,727, 4 pages.
"Folding wing," Wikipedia Foundation, Inc., dated Jun. 2, 2013, 5 pages. Accessed Jul. 29, 2013, http://en.wikipedia.org/wiki/Folding_wing.
Young et al., "Aircraft Excrescence Drag," North Atlantic Treaty Organization Advisory Group for Aerospace Research and Development AGARD-AG-264, Jul. 1981, 172 pages.
Office Action, dated Mar. 24, 2015, regarding U.S. Appl. No. 13/962,952 , 24 pages.
Final Office Action, dated Aug. 21, 2015, regarding U.S. Appl. No. 13/962,952 , 12 pages.
Office Action, dated Jul. 20, 2015, regarding U.S. Appl. No. 14/022,622, 23 pages.
Notice of Allowance, dated Nov. 12, 2015, regarding U.S. Appl. No. 14/022,622, 15 pages.
Notice of Allowance, dated Aug. 6, 2015, regarding U.S. Appl. No. 14/049,425, 20 pages.
Notice of Allowance, dated Jul. 24, 2015, regarding U.S. Appl. No. 13/964,072, 17 pages.

(56) References Cited

OTHER PUBLICATIONS

Office Action, dated Sep. 23, 2015, regarding U.S. Appl. No. 13/966,754, 16 pages.
Fox, "Fold Wing Tip Having Stub Spar," U.S. Appl. No. 13/251,216, filed Oct. 1, 2011, 16 pages.
Kordel et al., "Latching Apparatus and Methods," U.S. Appl. No. 13/493,688, filed Jun. 11, 2012, 38 pages.
Good et al., "Wing Hinge Assembly Including Hinged Torque Boxes," U.S. Appl. No. 13/664,371, filed Oct. 30, 2012, 20 pages.
Dong, "Adaptive Wing for an Aircraft," U.S. Appl. No. 13/871,296, filed Apr. 26, 2013, 27 pages.
Fox et al., "Wing Fold System," U.S. Appl. No. 13/962,952, filed Aug. 9, 2013, 48 pages.
Santini et al., "Horizontal Folding Wingtip," U.S. Appl. No. 13/964,072, filed Aug. 10, 2013, 63 pages.
Fox et al., "Wing Fold System Rotating Latch," U.S. Appl. No. 13/966,754, filed Aug. 14, 2013, 90 pages.
Good et al., "Wing Fold System Two Fail Safe Latch Pins Through Multiple Mating Lugs," U.S. Appl. No. 14/049,425, filed Oct. 9, 2013, 80 pages.
Lassen et al., "Wing Fold Controller," U.S. Appl. No. 14/022,622, filed Sep. 10, 2013, 61 pages.
Office Action, dated Dec. 31, 2015, regarding U.S. Appl. No. 13/962,952, 30 pages.
Final Office Action, dated Feb. 10, 2016, regarding U.S. Appl. No. 13/966,754, 35 pages.
Office Action, dated Feb. 8, 2016, regarding U.S. Appl. No. 14/335,625, 38 pages.
Extended European Search Report, dated Sep. 18, 2018, regarding Application No. 18184756.7, 6 pages.
Notice of Allowance, dated Mar. 6, 2019, regarding U.S. Appl. No. 15/265,258, 47 pages.
Office Action, dated Mar. 13, 2019, regarding U.S. Appl. No. 15/248,641, 42 pages.

* cited by examiner

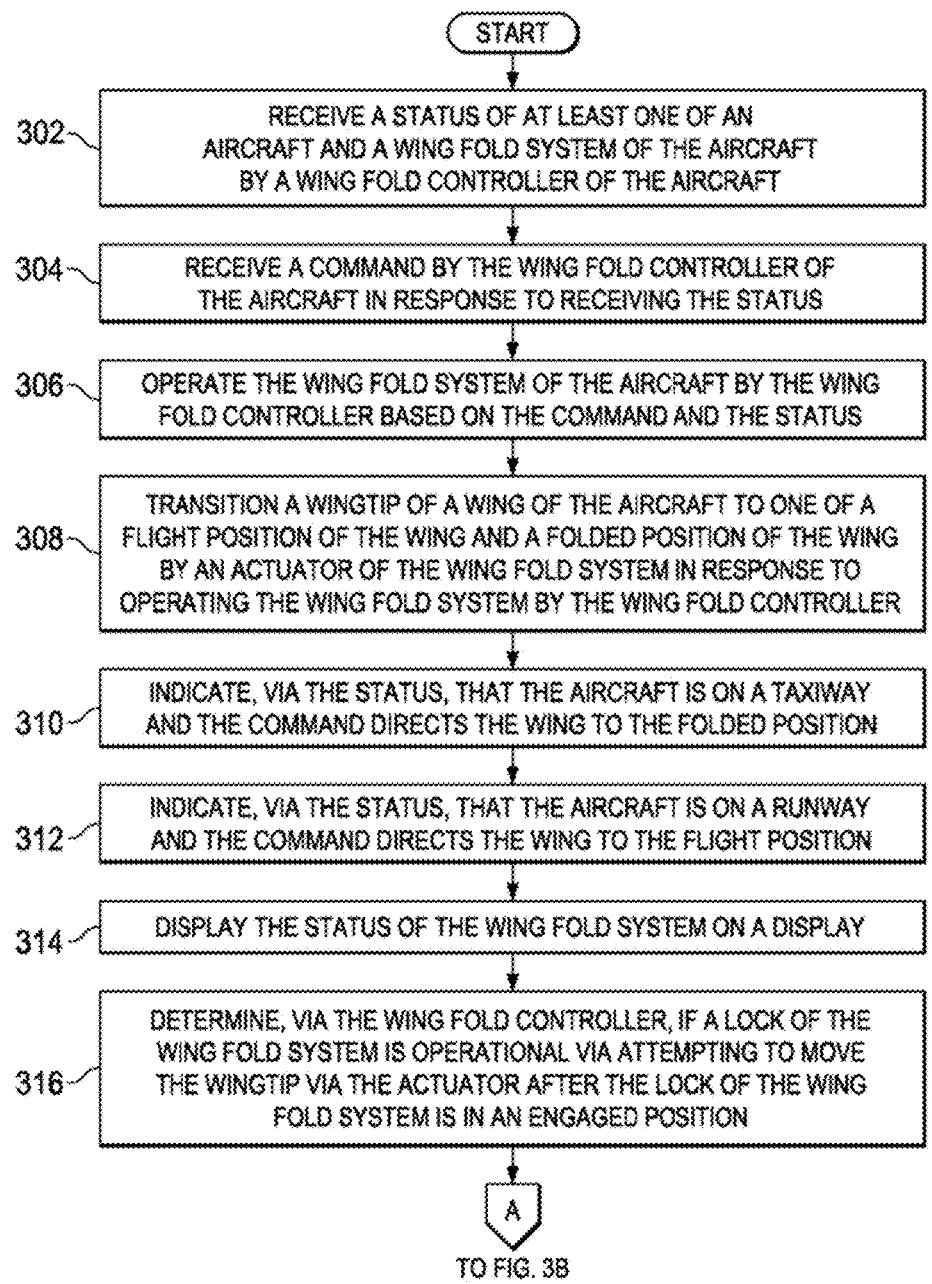

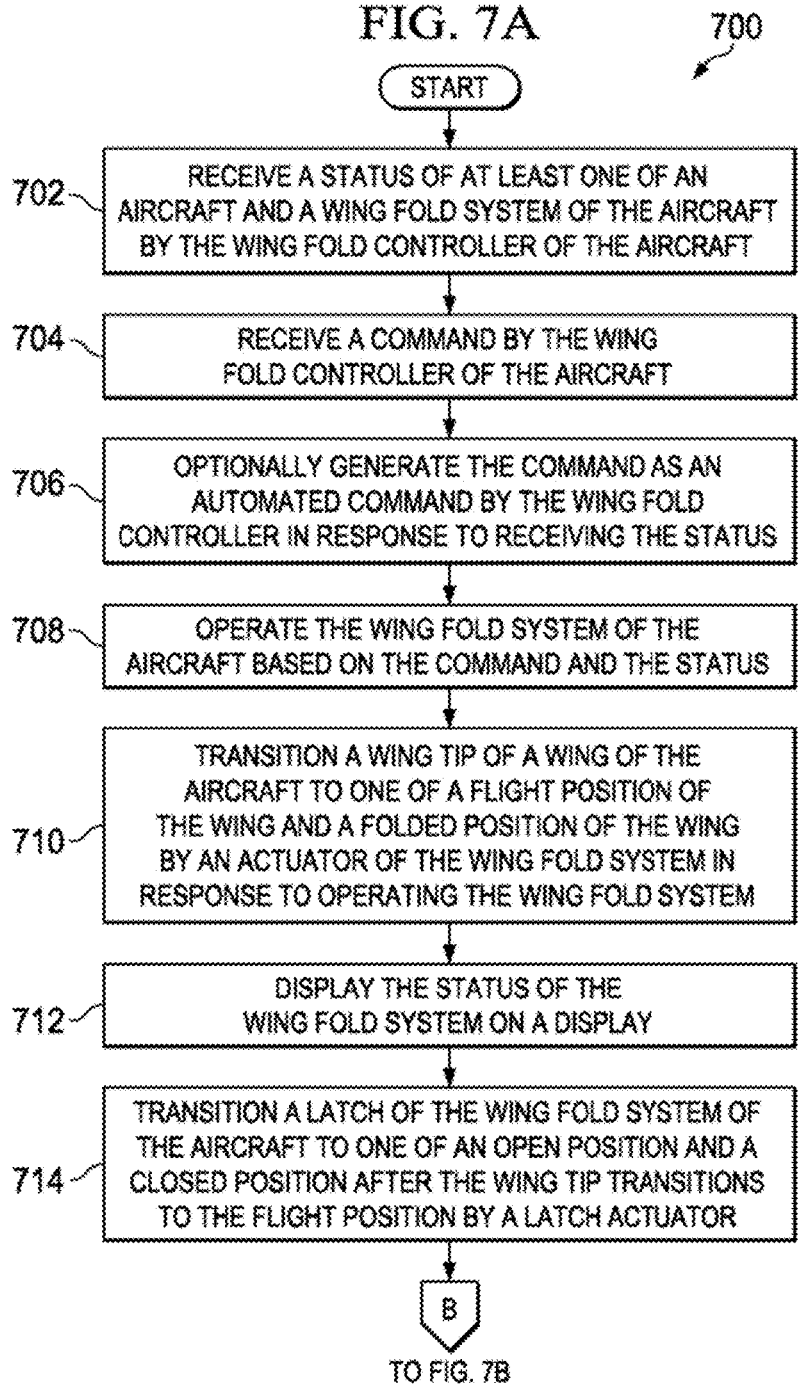

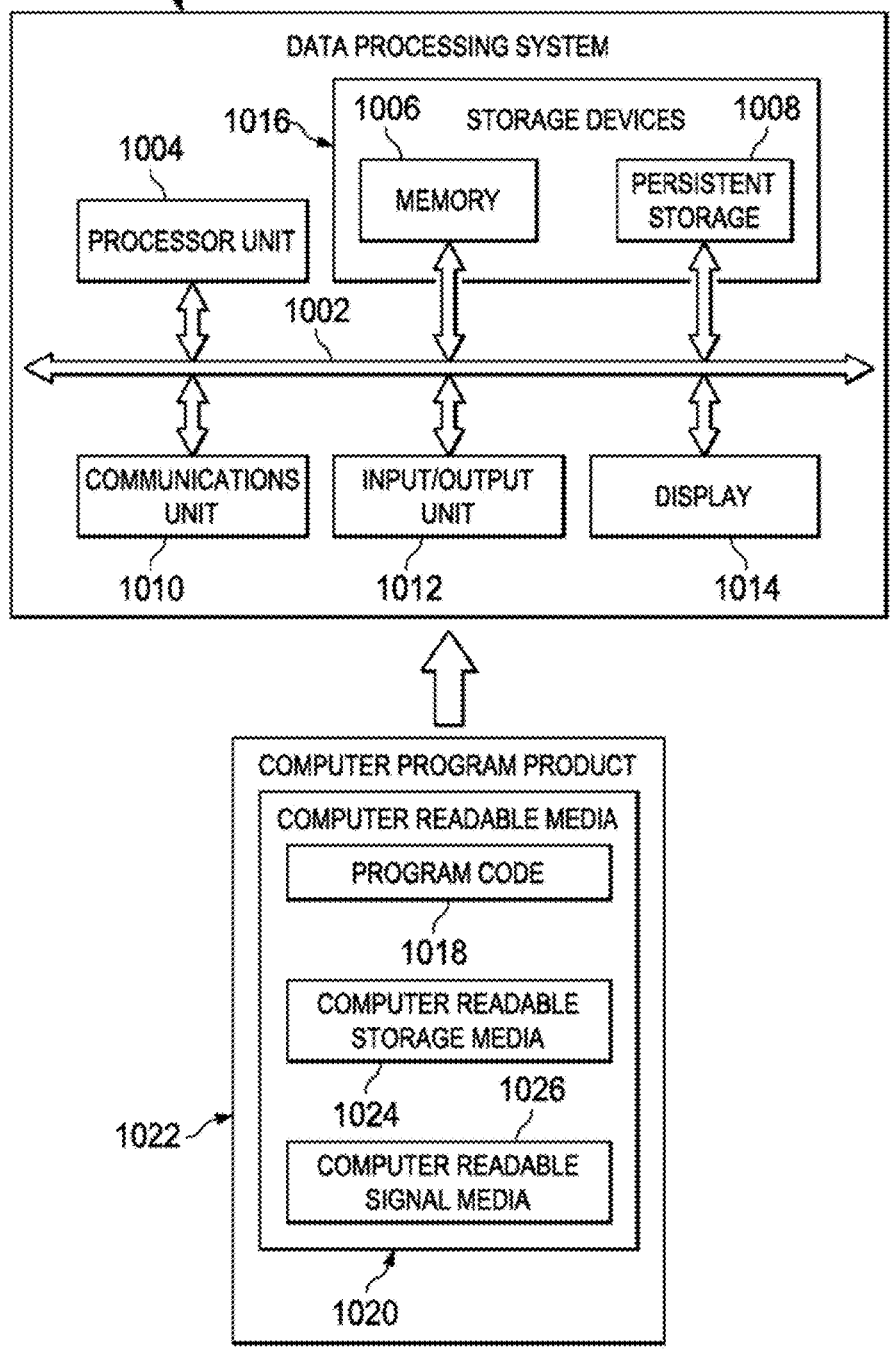

WING FOLD CONTROLLER

CROSS REFERENCE AND PRIORITY

The instant application is a continuation of U.S. patent application Ser. No. 14/022,622, filed Sep. 10, 2013 and issued as U.S. Pat. No. 9,290,260 on Mar. 22, 2016, which was a continuation-in-part of U.S. patent application Ser. No. 13/664,416, filed Oct. 30, 2012, which was a continuation-in-part of U.S. patent application Ser. No. 13/251,216 filed Oct. 1, 2011 and issued as U.S. Pat. No. 9,908,612 on Mar. 6, 2018; U.S. patent application Ser. No. 14/022,622 claims the benefit of Provisional U.S. Patent Application No. 61/720,338, filed Oct. 30, 2012; the entire disclosures of each of the above noted applications are incorporated by reference herein.

FIELD OF THE DISCLOSURE

This disclosure relates to systems and methods for controlling wings, and more specifically, to systems and methods for controlling wingtips to enhance aircraft performance and fuel efficiency.

BACKGROUND OF THE DISCLOSURE

In the commercial air transport industry, it is desirable to design aircraft configurations that yield reduced fuel burn per seat-mile, as fuel burn per seat-mile is a measure of fuel efficiency. Efficient aircraft configurations are ever more important as fuel costs continue to increase. Aircraft aerodynamic drag and fuel burn are generally reduced as the aspect ratio of the aircraft wing increases. Similarly, operating larger aircraft which carry more passengers and payload is generally more efficient between two destinations than flying several trips with smaller aircraft. Thus, larger aircraft and aircraft with longer wingspans tend to be more efficient. However, taxiway spacing and gate locations for most airports were established without providing adequate spacing for aircraft with the longer wingspans that may be produced with today's technology.

Some attempts have been made to improve aircraft wing efficiency without adding wingspan. Winglets extending vertically from the wingtips have improved aircraft fuel efficiency without significantly increasing wingspan. However, the efficiency added by winglets may not be as beneficial as that provided by extending the wingspan.

Therefore, it would be desirable to have a method and apparatus that takes into account at least some of the issues discussed above, as well as other possible issues.

SUMMARY

The illustrative embodiments may provide a method of controlling folding a wing. The method may include: receiving a status of at least one of an aircraft, and controlling, via a wing fold system of the aircraft, folding the wing. The method also may include receiving an automated command by the wing fold controller of the aircraft in response to receiving the status. The method also may include operating the wing fold system of the aircraft by the wing fold controller based on the automated command and the status. The method also may include transitioning a wingtip of a wing of the aircraft to one of a flight position of the wing and a folded position of the wing by an actuator of the wing fold system in response to operating the wing fold system by the wing fold controller.

The illustrative embodiments may also provide for an apparatus to control a wing fold system of a wing of an aircraft. The apparatus may include a wing fold controller configured to receive a status of at least one of the aircraft or the wing fold system of the aircraft. The apparatus also may include the wing fold controller configured to receive an automated command based on receiving the status. The apparatus also may include the wing fold controller configured to operate the wing fold system of the aircraft based on the command and the status. The apparatus also may include an actuator configured to transition a wingtip of a wing of the aircraft to one of a flight position of the wing and a folded position of the wing in response to operating the wing fold system by the wing fold controller.

The illustrative embodiments may also provide for an aircraft. The aircraft may include a fuselage configured for flight and a computer. The computer may include a bus, a processor connected to the bus, and a memory connected to the bus, the memory storing a program code which, when executed by the processor, performs a computer-implemented method. The program code may include program code for receiving a status of at least one of an aircraft and a wing fold system of the aircraft by the wing fold controller of the aircraft. The program code also may include program code for receiving an automated command by the wing fold controller of the aircraft in response to receiving the status. The program code also may include program code for performing, using the processor, operating the wing fold system of the aircraft by the wing fold controller based on the command and the status. The program code also may include program code for performing, using the processor, transitioning a wingtip of a wing of the aircraft to one of a flight position of the wing and a folded position of the wing by an actuator of the wing fold system in response to operating the wing fold system by the wing fold controller.

The features, functions, and benefits may be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIGS. 3A and 3B are a flowchart of a method of folding a wing via a wing fold controller in accordance with an illustrative embodiment;

FIGS. 7A and 7B are a flowchart of a method of a wing fold controller in accordance with an illustrative embodiment;

FIG. 10 is an illustration of a data processing system, in accordance with an illustrative embodiment.

DETAILED DESCRIPTION

Figure 1:
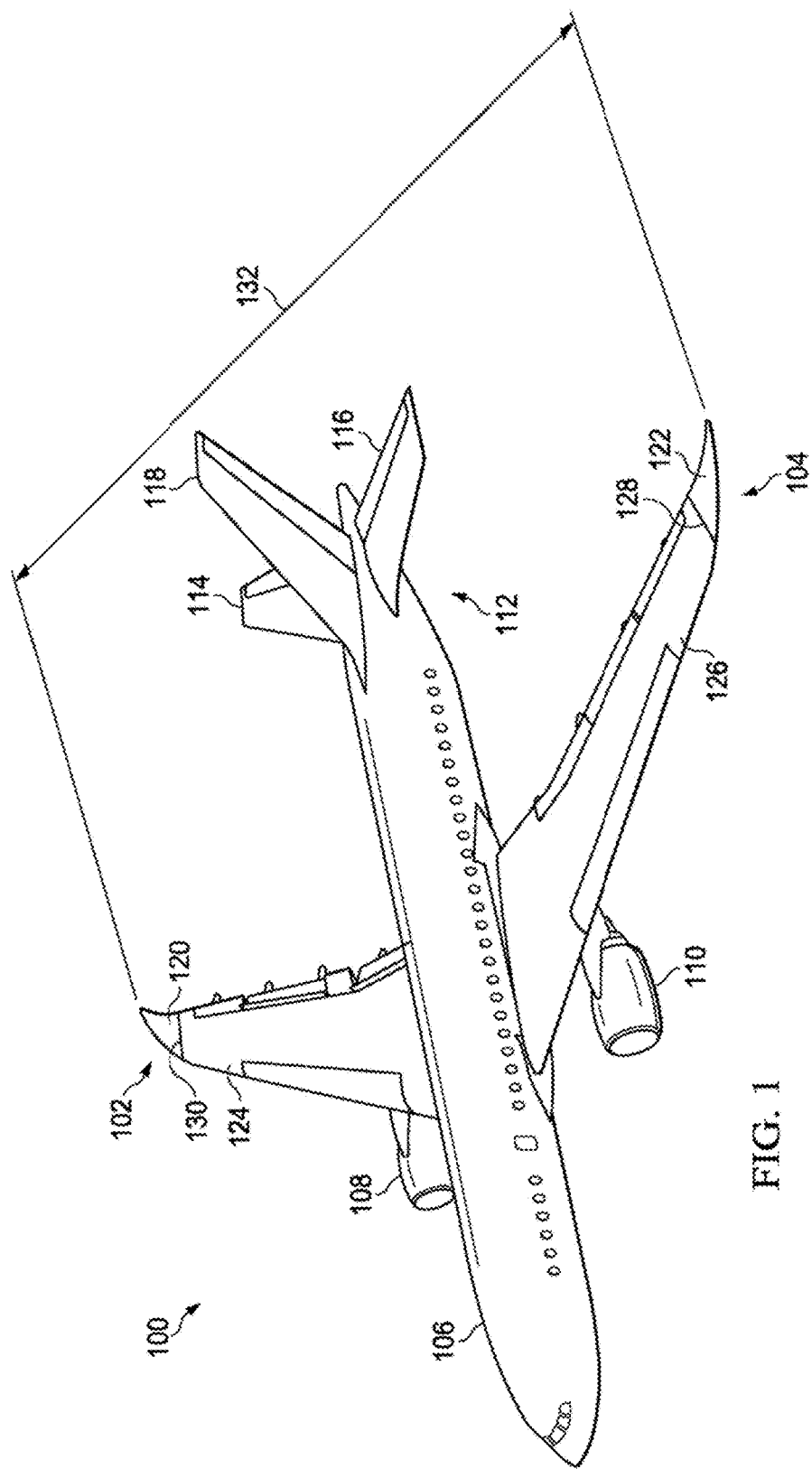
FIG. 1 is a diagram of an aircraft embodying a wing fold controller in accordance with an illustrative embodiment.

Illustrative embodiments may recognize and take into account one or more different considerations. For example, having an aircraft that may benefit from a long wingspan in flight, while being able to reduce the wingspan when operating at an airport such as but not limited to International Civil Aviation Organization "code E" or Federal Aviation Administration "code V" airports, may be desirable with respect to increasing the flexibility of where an aircraft may operate. In particular, by being able to reduce the wingspan while on the ground, an aircraft may be able to operate at more airports than if the aircraft could not reduce its wingspan while on the ground. With the longer wingspan during flight, benefits may include fuel efficiency.

Thus, control of the wingspan of an aircraft may be advantageously achieved through the use of a wing fold controller and wing fold system. The wing fold controller receives status of the aircraft and wing fold system and also receives commands to control the state of the wing fold system. Based on the status and the commands, the wing fold controller transitions the wing fold system between a folded position and a flight position, therein controlling the wingspan of the aircraft.

The illustrative embodiments may allow for folding and extending of wingtips that may be based on, without limitation, information about aircraft status and/or the environment around the aircraft. Folding and extending of wingtips may be automated.

Aircraft status may include, without limitation, a configuration of the aircraft, or a condition of any aircraft status that may affect any component or feature of a wing fold system. The environment around the aircraft may include, without limitation, aircraft location during preparation for takeoff or after landing, and/or structures, obstacles, or vehicles and/or weather phenomenon around the aircraft.

Architecture provided herein includes an electronic wingtip folding system that may allow for higher availability based in part on addition of redundant system components. Such components may include controllers, analog to digital converters, control lanes, control channels, and/or sensors. The system may be more adaptive to automated operation than any existing wing fold system.

The illustrative embodiments may promote more ease in modification to wingtip folding functionality. Such functionality may include modification of software code as opposed to altering mechanical hardware and kinematic interfaces. Diagnostic capability of the wingtip system may include earlier detection of vulnerable components which may reduce time of exposure to latent vulnerabilities.

The system may be less subject to dynamic mechanical feedback. The illustrative embodiments may promote greater ease in verifying functionality of the system, allowing for checks of the system for possible latent problems via automated, periodic system tests. For example, the system may verify that a moveable wingtip may be latched or locked to a fixed wingtip. The system may automatically attempt to fold the wingtip after sensing the wingtip may be in a latched and locked configuration. If the attempt is not successful in moving the wingtip system, the aircraft may be verified to be in a flightworthy condition (with regard to the wingtips). If the system is able to move the wingtip or critical parts of the system, then a crew-altering system may annunciate that the aircraft is in a non-flightworthy condition.

The illustrative embodiments may promote a reduced workload on crew. Minimal or no crew actions may be required to configure wingtips for flight or ground operations including taxiway and gate operations. Location-based alerting may also be promoted. Prior to takeoff, the system may verify that the aircraft may be in flightworthy configuration before engine thrust may be applied. After landing touchdown, the system may verify that the aircraft may be in a correct configuration for operation around the airport where reduced wingspan is required such as, without limitation, taxiway, other runway, gate, ramp, apron, and/or maintenance facility operations.

The illustrative embodiments may provide improvements over previous wing control arrangements that may require large spatial integration volume. Such previous requirements may result in increased wing loft that may cause excess drag and greater weight. Previous arrangements also may not be readily modified or optimized once their designs are finalized.

By contrast, the illustrative embodiments may provide a more electrical and optical control which may reduce component volume and allow for optimization and modification via software updates. Further, the illustrative embodiments may alleviate concerns over lightning strikes and electromagnetic effects when considering optical signal transmission. A more electric architecture may allow for easier build and maintainability of aircraft through installation of replaceable components as opposed to mechanical components that may require individual shimming and rigging.

Unless otherwise noted and where appropriate, similarly named features and elements of an embodiment of one figure of the disclosure correspond to and embody similarly named features and elements of embodiments of the other figures of the disclosure.

Figure 2:
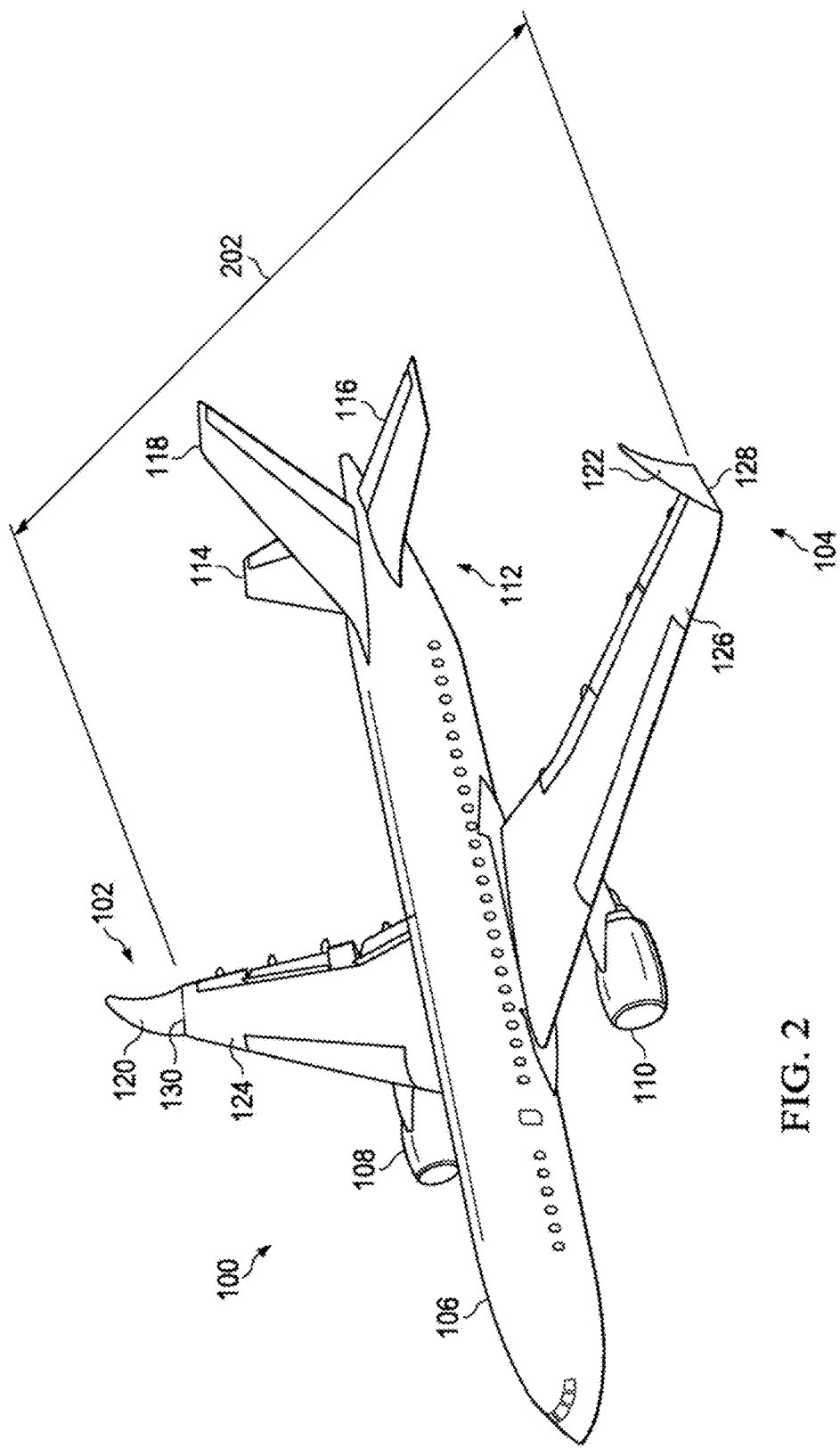
FIG. 2 is a diagram of an aircraft embodying a wing fold controller in accordance with an illustrative embodiment.

Attention is turned to the figures. FIG. 1 is a diagram of an aircraft embodying a wing fold controller in accordance with an illustrative embodiment. FIG. 2 is a diagram of an aircraft embodying a wing fold controller in accordance with an illustrative embodiment. Reference numerals used in FIG. 1 are also used in FIG. 2.

Aircraft 100 may be an example of an aircraft in which a wing fold system may be implemented in accordance with an illustrative embodiment. In an illustrative embodiment, aircraft 100 may include wing 102 and wing 104 attached to body 106; engine 108 attached to wing 102; engine 110 attached to wing 104. FIG. 1 depicts wings 102 and 104 of aircraft 100 in a flight position, with wingspan 132. FIG. 2 depicts wings 102 and 104 aircraft 100 in a folded position, with wingspan 202. Wingspan 202 may be less than wingspan 132.

Wing 102 may include fixed portion 124 and unfixed portion 120. Fixed portion 124 may be an inboard portion of wing 102, which may be fixed to body 106. Similarly, wing 104 may include fixed portion 126 and unfixed portion 122. Wing 102 may include wing fold system 130 to move unfixed portion 120 with respect to fixed portion 124. Wing 104 may include wing fold system 128 to move unfixed portion 122 with respect to fixed portion 126.

Body 106 has tail section 112. Horizontal stabilizer 114, horizontal stabilizer 116, and vertical stabilizer 118 are attached to tail section 112 of body 106. Wing fold system 128 and wing fold system 130 each include a latch assembly (not depicted in FIG. 1 or FIG. 2) in accordance with an illustrative embodiment.

Figure 3B:
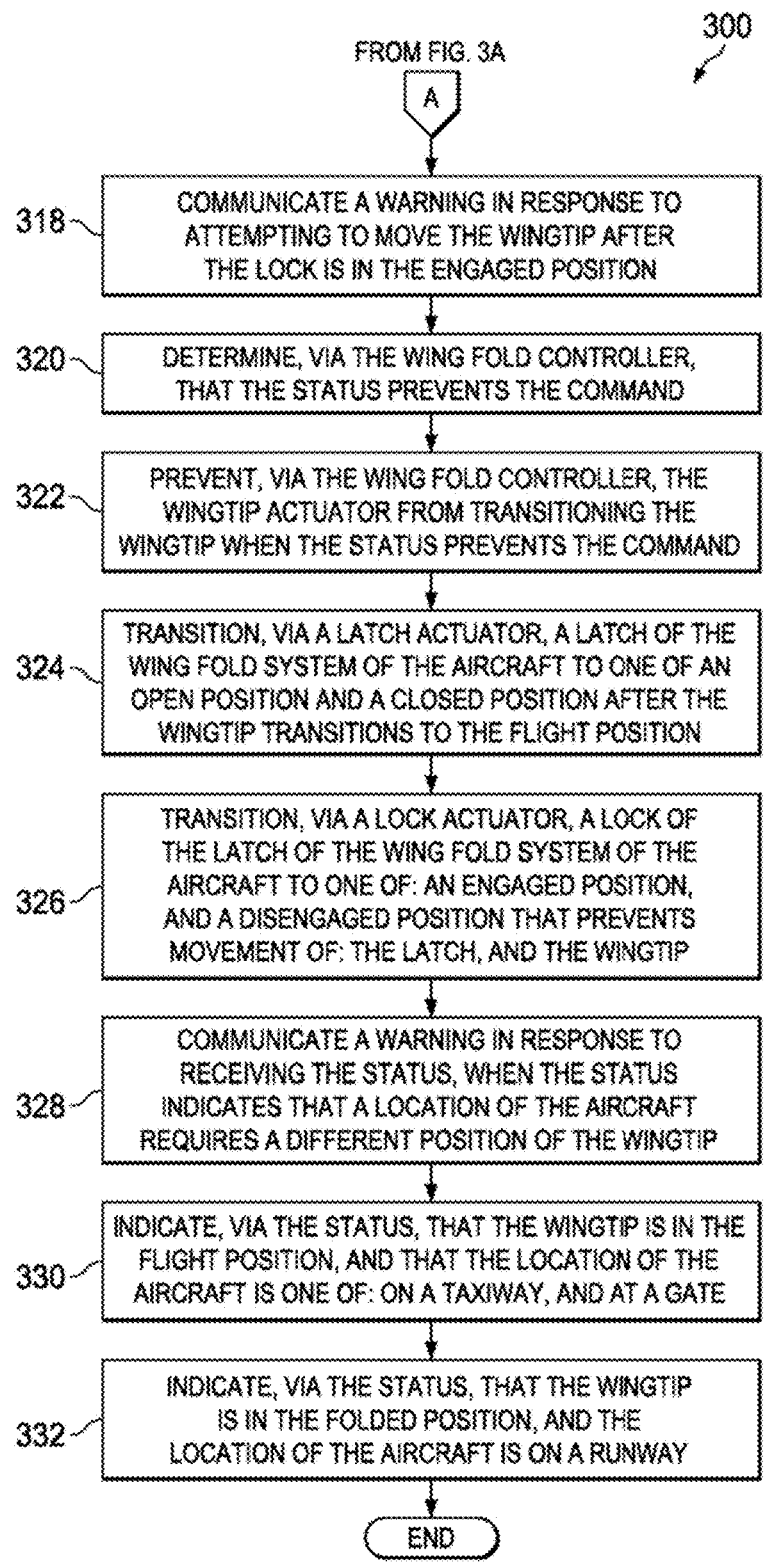

FIGS. 3a and 3b are a flowchart of a method 300 of folding a wing via a wing fold controller in accordance with an illustrative embodiment. Method 300 shown in FIG. 3 may be implemented using aircraft 100 of FIG. 1 and FIG. 2. The process shown in FIG. 3 may be implemented by a processor, such as processor unit 1004 of FIG. 10. The process shown in FIG. 3 may be a variation of the processes shown in FIG. 1 and FIG. 2 and FIG. 4 through FIG. 10. Although the operations presented in FIG. 3 are described as being performed by a "process," the operations are being performed by at least one tangible processor or using one or more physical devices, as described elsewhere herein. The term "process" also may include computer instructions stored on a non-transitory computer readable storage medium.

Method 300 may begin as the process may receive a status of at least one of an aircraft and a wing fold system of the aircraft by the wing fold controller of the aircraft (operation 302). The status may be displayed on a display.

Next, the process may receive a command by the wing fold controller of the aircraft in response to receiving the status (operation 304). The command may be an automated command.

Next, the process may operate the wing fold system of the aircraft by the wing fold controller based on the command and the status (operation 306). Next, the process may transition a wingtip of a wing of the aircraft to one of a flight position of the wing and a folded position of the wing by an actuator of the wing fold system in response to operating the wing fold system by the wing fold controller (operation 308).

Next, the process may indicate, via the status, that the aircraft may be on a taxiway and the command directs the wing to the folded position (operation 310). Alternatively, the process may indicate, via the status, that the aircraft may be rolling toward a taxiway and the command directs the wing to the folded position.

Next, the process may indicate, via the status, that the aircraft may be on a runway and the command directs the wing to the flight position (operation 312). Alternatively, the process may indicate, via the status, that the aircraft may be rolling toward a runway and the command directs the wing to the flight position. Next, the process may display the status of the wing fold system on a display (operation 314).

Next, the process may determine, via the wing fold controller, if a lock of the wing fold system may be operational via attempting to move the wingtip via the actuator after the lock of the wing fold system may be in an engaged position (operation 316). Operation 316 may also be a test of the operation of a latch of the wing fold system.

Next, the process may communicate a warning in response to attempting to move the wingtip after the lock may be in the engaged position (operation 318). Next, the process may determine, via the wing fold controller, that the status prevents the command (operation 320).

Next, the process may prevent, via the wing fold controller, the wingtip actuator from transitioning the wingtip when the status prevents the command (operation 322). Next, the process may transition, via a latch actuator, a latch of the wing fold system of the aircraft to one of an open position and a closed position after the wingtip transitions to the flight position (operation 324). Next, the process may transition, via a lock actuator, a lock of the latch of the wing fold system of the aircraft to one of: an engaged position, and a disengaged position that prevents movement of: the latch, and the wingtip (operation 326).

Next, the process may communicate a warning in response to receiving the status, when the status indicates that a location of the aircraft requires a different position of the wingtip (operation 328). Next, the process may indicate, via the status, that the wingtip may be in the flight position, and that the location of the aircraft may be one of: on a taxiway, and at a gate (operation 330). Alternatively, the aircraft location may be inside a building or in proximity to a vehicle or obstacle that the wing fold controller may predict may contact the wingtip. Further, the aircraft may be rolling toward a taxiway, a gate, a building, a vehicle or obstacle that the wing fold controller may predict may contact the wingtip.

Next, the process may indicate, via the status, that the wingtip may be in the folded position, and the location of the aircraft may be on a runway (operation 332). Alternatively, the aircraft location may be rolling toward a runway.

Figure 4:
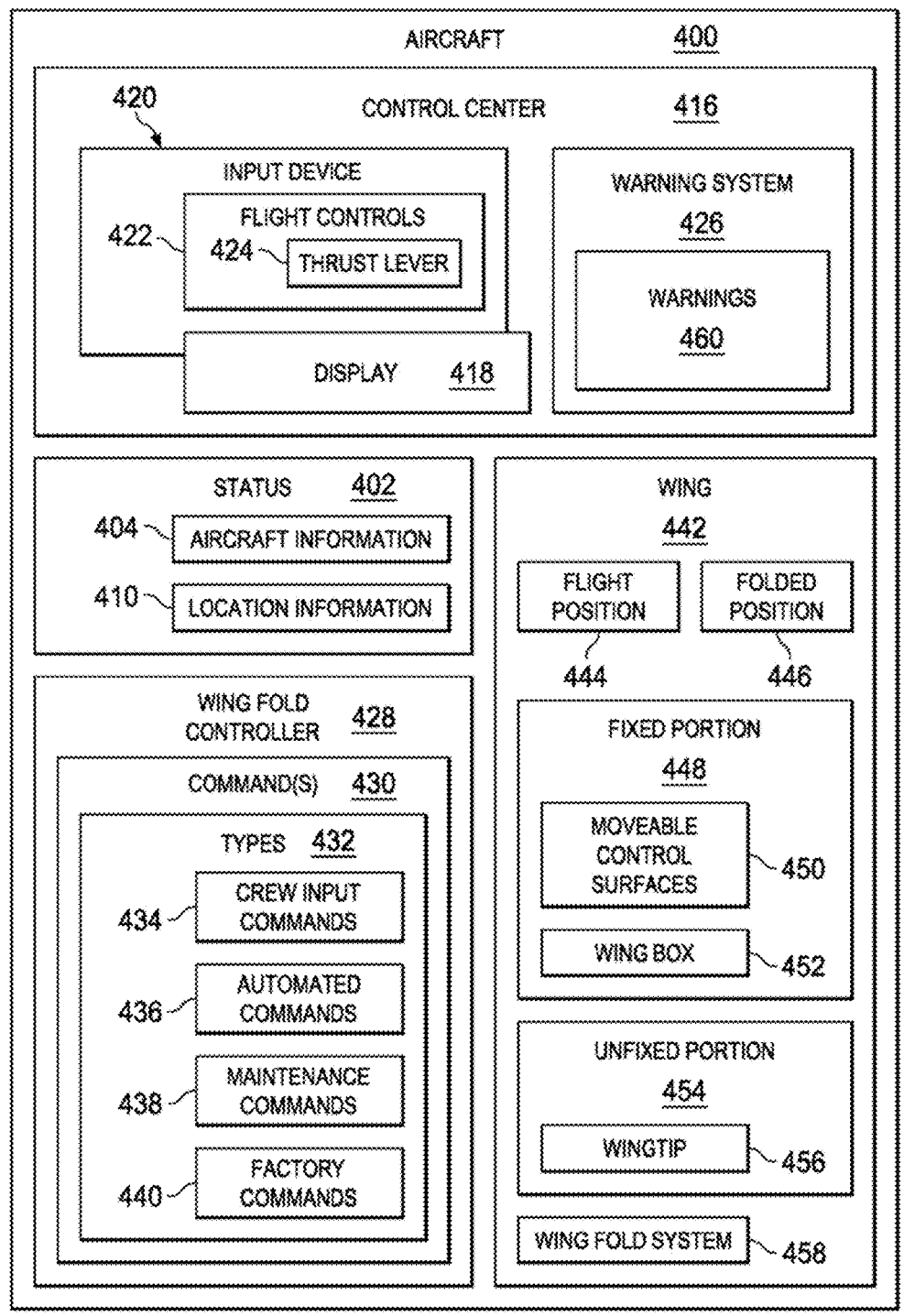
FIG. 4 is a block diagram of an aircraft embodying a wing fold controller in accordance with an illustrative embodiment.

FIG. 4 is a block diagram of an aircraft embodying a wing fold controller in accordance with an illustrative embodiment. Aircraft 400 may be an illustrative embodiment of aircraft 100 depicted in FIG. 1 and FIG. 2. Aircraft 400 may include several features, elements, and components, including: status 402, control center 416, wing fold controller 428, and wing 442.

Status 402 may include aircraft information 404 and location information 410. Aircraft information 404 may include information related to aircraft 400 that may be used by wing fold controller 428 to control wing fold system 458. Aircraft information 404 may indicate a status including, without limitation, one or more of: whether aircraft 400 may be in-flight, whether aircraft 400 may be standing, whether aircraft 400 may be taxiing, whether aircraft 400 may be performing a takeoff, whether aircraft 400 may be performing an initial climb, whether aircraft 400 may be en route, whether aircraft 400 may be maneuvering, whether aircraft 400 may be performing an approach, whether aircraft 400 may be landing, a speed of aircraft 400, a wind speed of air surrounding aircraft 400, a status of an aircraft system, and/or whether aircraft 400 may be in a flightworthy configuration. An aircraft that may be standing may be aircraft 400 that may be on the ground, but the location information 410 of aircraft 400 may not be changing. An aircraft system that may be used by wing fold controller may include, without limitation, a hydraulic system, an electrical system, wiring, an actuator, and a controller.

Location information 410 may include information related to a position of aircraft 400 relative to its surroundings that may be used by wing fold controller 428 to control wing fold system 458. Surroundings related to aircraft 400 may include, without limitation: a taxiway, an apron, a de-icing station, a run-up pad, a runway, a gate, a maintenance facility, any obstacle, and/or any vehicle. Information on relative surroundings may be provided by, without limitation, an onboard database, datalinked information, Global Positioning System (GPS) derived information, radar, and/or Automatic Dependent Surveillance-Broadcast (ADS-B) derived information. Location information 410 may indicate and may be used to determine if wing 442 may be required to be in folded position 446, such as when aircraft 400 may be at a point on an airport, such as on a taxiway or at a gate, that may require a limited wingspan.

Control center 416 may be a cockpit in aircraft 100. Alternatively, control center 416 may be outside aircraft 100 and connected via data link to aircraft 100. Without limitation, control center 416 may include a maintenance facility or computer system. Control center 416 may contain input device 420, display 418, and warning system 426. Input device 420 may be used to control and operate aircraft 100. Without limitation, input device 420 may be include a switch, screen or device in a cockpit, a controller or other processor in or linked to aircraft 400, or by an aircraft operator in control center 416. An aircraft operator may be a crew member in a cockpit, or another operator, which may be a processor in control center 416.

Display 418 may display any portion of status 402 to aircraft 400. Display 418 may be viewed by an operator of aircraft 400. Display 418 may be one of several displays in control center 416 that are of any type, size, or shape to display information to crew members. Display 418 may be a touch sensitive display to allow for inputs from a crew member to control aircraft 400 via display 418.

Input device 420 may control operation of aircraft 400 and allow command(s) 430 to be sent to wing fold controller 428. Input device 420 may include any number of flight controls 422 that control flight of aircraft 400. Flight controls 422 may include thrust lever 424 that controls thrust of aircraft 400. Input device 420 may include display 418 when display 418 allows for inputs.

Warning system 426 of aircraft 400 may issue warnings 460 to control center 416 or to associated facilities. Without limitation, associated facilities may include: air traffic control facilities, airline dispatch facilities, or airline or manufacturer maintenance facilities. Warnings 460 may include transmissions to an airport control tower, to nearby aircraft, to a dispatcher for aircraft 400, to a maintenance monitor for aircraft 400, and/or to other systems outside aircraft 400 that monitor aircraft 400. Warnings 460 may indicate when wingtip 456 of wing 442 may be not in a proper position based on status 402 of aircraft 400. Warnings 460 may also indicate when wing fold system 458 may be not properly functioning. Warnings 460 may be communicated visually, mechanically, electronically, and/or audibly. Warnings 460 may be displayed via display 418. Warnings 460 may be integrated into existing takeoff or landing configuration warning systems. Warnings 460 may be a single warning or a plurality of warnings. The single warning or the plurality of warnings may be sent to a single recipient or to multiple recipients.

When thrust lever 424 of aircraft 400 may be moved to a position that may be inappropriate for a position of wingtip 456, command 430 of thrust lever 424 may be prevented. If thrust lever 424 may be moved to a takeoff position, but wingtip 456 may be in a position that may not be allowed for takeoff, such as folded position 446, warnings 460 may be issued. Further, command(s) 430 to increase thrust may be prevented until wingtip 456 may be in an appropriate position. Alternatively, or additionally, wing fold controller 428 may command 430 wingtip 456 to flight position 444. Command 430 may be an automated command.

Warning system 426 may send warnings 460 based on a location of aircraft 400. Warnings 460 may include aircraft location data. Warnings 460 may include a recommended action to mitigate warnings 460. Location-based warnings 460 may be used before takeoff to verify aircraft 400 may be in a correct configuration for takeoff when aircraft 400 approaches the takeoff end of a runway. The correct configuration may be based on aircraft information 404. Aircraft information 404 may include a position of wingtip 456. Thus, warning system 426 may issue warnings 460 if wingtip 456 was not extended in flight position 444 before takeoff.

Warnings 460 based on location information 410 of aircraft 400 may be used after landing to verify aircraft 400 may be in a correct configuration for airport compatibility. The correct configuration for airport compatibility may include having wingtip 456 in folded position 446 before aircraft 400 operates on designated airport areas. Designated airport areas may include a taxiway, an apron, a de-icing station, a run-up pad, a runway, a gate, and/or even certain runways. For example, an airport may limit taxiway use to certain aircraft wing-span lengths. If aircraft 400 wingspan exceeds a particular taxiway wingspan limit with wingtip 456 in flight position 444, but aircraft 400 may be within the limit when wingtip 456 may be in folded position 446, warnings 460 could be issued before aircraft 400 enters the particular taxiway with wingtip 456 in flight position 444. As another example, warning system 426 may issue a warning if aircraft 400 was approaching a gate with a wingtip configuration exceeding a wingspan limit of the gate.

Wing fold controller 428 may include any grouping of one more processors and programs of aircraft 400 that operate aircraft 400. Wing fold controller 428 may be a component of a computer inside control center 416, a component of a computer outside control center 416, a component of a computer or controller of wing fold system 458 in wing 442, or any combination thereof.

Wing fold controller 428 may receive status 402 related to aircraft 400 and to wing fold system 458. Wing fold controller 428 may receive commands 430 via at least crew inputs 434. Wing fold controller 428 may operate wing fold system 458 based on command(s) 430 received.

Wing fold controller 428 may determine that a lock of wing fold system 458 may be operational. If the lock may be operational, then wingtip 456 should not be able to move when wingtip 456 may be in flight position and the lock may be engaged. To make the determination, wing fold controller 428 may attempt to move wingtip 456 after a lock of wing fold system 458 may be in an engaged position with respect to a latch of wing fold system 458 that may be in a closed position. Wing fold controller 428 may attempt to move wingtip 456 by attempting to move unfixed portion 454. Wing fold controller 428 communicates warnings 460 via warning system 426 in response to attempting to move wingtip 456 when wingtip 456 moves even though the lock may be in the engaged position and the latch may be in the closed position.

Wing fold controller 428 may be a single microcontroller or microprocessor, or may be one in a group of processors of aircraft 400. Wing fold controller 428 may receive input data, status data, and configuration data. Wing fold controller 428 may send command data and alert data based on input data, status data, and configuration data.

Wing fold controller 428 may be implemented in software, hardware, or a combination of software and hardware. When software may be used, the operations performed by wing fold controller 428 may be implemented in program code configured to run on a processor unit. The processor unit may, for example, be one or more central processor units in a computer system that may be a general purpose computer. General purpose computers are described with respect to FIG. 10.

When hardware may be employed, the hardware may include circuits that operate to perform the operations in wing fold controller 428. In the illustrative examples, the hardware may take the form of a circuit system, an integrated circuit, an application specific integrated circuit (ASIC), a programmable logic device, some other suitable type of hardware configured to perform a number of operations, or a combination thereof. With a programmable logic device, the device may be configured to perform the number of operations. The programmable logic device may be reconfigured at a later time or may be permanently configured to perform the number of operations.

Examples of programmable logic devices may include, for example, a programmable logic array, programmable array logic, a field programmable logic array, a field programmable gate array, and other suitable hardware devices. Additionally, the processes may be implemented in organic components integrated with inorganic components and/or may be included entirely of organic components excluding a human being. For example, the processes may be implemented as circuits in organic semiconductors.

Command(s) 430 may be received by wing fold controller 428. Command(s) 430 may be received from input device 420. Types 432 of command(s) 430 include crew input commands 434, automated commands 436, maintenance commands 438, and factory commands 440. Command(s) 430 may be any one of or a combination of crew input commands 434, automated commands 436, maintenance commands 438, and factory commands 440. Command(s) 430 may be used to control wing fold system 458.

Wing 442 may be an illustrative embodiment of wing 102 and/or wing 104 in FIG. 1 and FIG. 2. Wing 442 may include flight position 444, folded position 446, fixed portion 448, unfixed portion 454, and wing fold system 458. The folding of wing 442 may allow for aircraft 400 to be flown with a wingspan that may be longer than that allowed for ground operations at an airport from which aircraft 400 may take off and land. Wing 442 may provide lift for aircraft 100 in FIG. 1.

Flight position 444 may be a state of wing 442. When wing 442 of aircraft 400 may be in flight position 444, aircraft 400 may be ready for flight. For example, wing 102 and wing 104 of FIG. 1 are shown in flight position 444.

Folded position 446 may be a state of wing 442. When wing 442 of aircraft 400 may be in folded position 446, aircraft 400 may not be ready for flight, but a wingspan of aircraft 400 may be smaller than the wingspan of aircraft 400 with wing 442 in flight position 444 and allow use of aircraft 400 at airports that may require smaller wingspans.

Fixed portion 448 may be an illustrative embodiment of fixed portion 124 of wing 102 and may be an embodiment of fixed portion 126 of wing 104 of FIG. 1 and FIG. 2. Fixed portion 448 of wing 442 may include wing box 452 and moveable control surfaces 450. Wing box 452 may be a structural component from which wing 442 extends. Moveable control surfaces 450 may include flaps that may allow for controlling flight of aircraft 400.

Unfixed portion 454 may be an embodiment of unfixed portion 120 of wing 102 and may be an embodiment of unfixed portion 122 of wing 104 of FIG. 1 and FIG. 2. Unfixed portion 454 may rotate with respect to fixed portion 448 of wing 442 between flight position 444 of wing 442 and folded position 446 of wing 442. Unfixed portion 454 of wing 442 may include wingtip 456. Wingtip 456 may not include moveable control surfaces 450.

Figure 5:
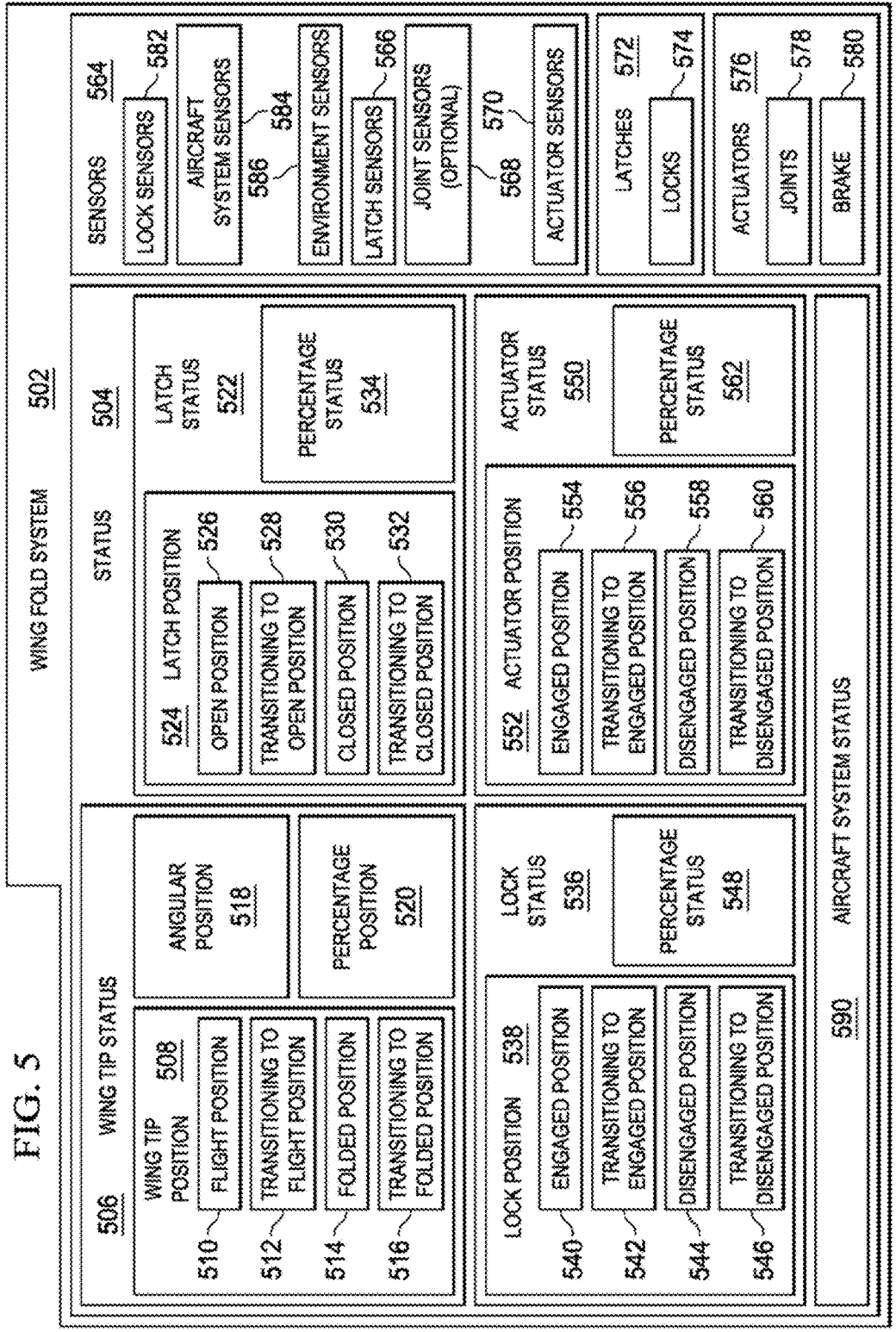
FIG. 5 is a block diagram of a wing fold system in accordance with an illustrative embodiment.

FIG. 5 is a block diagram of a wing fold system 502 in accordance with an illustrative embodiment. Wing fold system 502 may be an illustrative embodiment of wing fold system 128 and wing fold system 130 of aircraft 100 of FIG. 1 and FIG. 2 and wing fold system 458 of aircraft 400 of FIG. 4. Wing fold system 502 may move wingtip 456 of wing 442 of an aircraft between flight position 510 and folded position 514. Wing fold system 502 may be controlled by a wing fold controller 428 of aircraft 400.

Wing fold system 502 may include several features, elements, and components, including: status 504, sensors 564, latches 572, actuators 576, and joints 578. Wing fold system 458 may move wingtip 456 between flight position 444 and folded position 446. Wing fold system 458 may be controlled by wing fold controller 428.

Status 504 may include wingtip status 506, latch status 522, lock status 536, actuator status 550, and aircraft system status 590. Status 504 of wing fold system 502 may include information related to wing fold system 458 of FIG. 4.

Wingtip status 506 may indicate a status of wingtip 456 and may include wingtip position 508, angular position 518, and percentage position 520. Wingtip position 508 may indicate a state of wingtip 456 and may include flight position 510, transitioning to flight position 512, folded position 514, and transitioning to folded position 516. Angular position 518 may indicate an angle of wingtip 456 with respect to wing 442. Percentage position 520 may indicate a percentage related to a completion amount of a transition between flight position 444 and folded position 446.

Flight position 510 may indicate that wingtip 456 may be ready for flight. Transitioning to flight position 512 may indicate that wingtip 456 may be being moved to flight position 510. Folded position 514 may indicate that wingtip 456 may be fully folded so as to reduce an overall wingspan of an aircraft. Transitioning to folded position 516 may indicate that wingtip 456 may be being moved to folded position 514.

Latch status 522 may indicate a status of each latch of latches 572 or of any group of latches 572. Latch status 522 may indicate a status of latches 572 of wing fold system 502 and may include latch position 524 and percentage status 534. Without limitation, latch status 522 may also indicate a status for any actuator, wiring, hydraulic power, electric power, or sensor associated with the particular latch among latches 572.

Latch position 524 may indicate a position of a particular latch among latches 572 of wing fold system 502 and may include open position 526, transitioning to open position 528, closed position 530, and transitioning to closed position 532. Percentage status 534 may indicate a percentage related to a completion amount of a transition between open position 526 and closed position 530 of the particular latch among latches 572.

Open position 526 may indicate that a particular latch among latches 572 may be open and wingtip 456 may be not secured. Transitioning to open position 528 may indicate that the particular latch may be being moved to open position 526 to release wingtip 456 so that it may be folded. Closed position 530 may indicate that the particular latch may be closed and wingtip 456 may be secured. Transitioning to closed position 532 may indicate that the particular latch may be being moved to closed position 530 to secure wingtip 456.

Lock status 536 may indicate a status of each lock of a particular latch among latches 572 or of any group of locks 574 of latches 572. Lock status 536 may indicate a status of locks 574 of latches 572 of wing fold system 502 and may include lock position 538 and percentage status 548. Without limitation, lock status 536 may also indicate a status for any actuator, wiring, hydraulic power, electric power, or sensor associated with a particular latch among locks 574.

Lock position 538 may indicate a position of a lock of wing fold system 502 and may include engaged position 540, transitioning to engaged position 542, disengaged position 544, and transitioning to disengaged position 546. Percentage status 548 may indicate a percentage related to a completion amount of a transition between engaged position 540 and disengaged position 544.

Engaged position 540 may indicate that a lock may be engaged with a latch and may indicate that the latch may be secured. Engaged position 540 may be associated with wingtip 456 being in flight position 510. Transitioning to engaged position 542 may indicate that locks 574 may be transitioning to engaged position 540 to secure latch 572. Disengaged position 544 may indicate that a lock 574 may be not engaged with latches 572 and may indicate that latch 572 may be not secured. Disengaged position 544 may be associated with wingtip 456 being in folded position 514. Transitioning to disengaged position 546 may indicate that locks 574 may be transitioning to disengaged position 544 to release latches 572 so that wingtip 456 may fold.

Actuator status 550 may indicate a status of each actuator of wing fold system 502 or of any group of actuators 576. Actuator status 550 may include actuator position 552 and percentage status 562. Without limitation, actuator status 550 may also indicate a status for any controller, wiring, hydraulic power, electric power, or sensor associated with a particular actuator among actuators 576.

Actuator position 552 may indicate a position of an actuator of wing fold system 502 and may include engaged position 554, transitioning to engaged position 556, disengaged position 558, and transitioning to disengaged position 560. Percentage status 562 may indicate a percentage related to a completion amount of a transition between engaged position 554 and disengaged position 558.

Engaged position 554 may indicate that an actuator of wing fold system 502 may be engaged with a lock, latch, or wingtip 456. Transitioning to engaged position 556 may indicate that an actuator may be transitioning to engaged position 554 to actuate a lock, latch, or wingtip 456. Disengaged position 558 may indicate that an actuator may be not engaged with a lock, latch, or wingtip 456 and may be not providing any force thereto. Transitioning to disengaged position 560 may indicate that an actuator may be transitioning to disengaged position 558 to release a latch so that wingtip 456 may fold.

Aircraft system status 590 may include a status of any aircraft system that may affect wing fold system 502. Without limitation, aircraft hydraulic system, electrical system, wiring, controllers, and motors may affect wing fold system 502. Without limitation, a failure of electrical or hydraulic power to a component of wing fold system 502 may affect performance of a component of wing fold system 502.

Sensors 564 may sense positions and/or loads of components of wing fold system 502. Sensors 564 may include: latch sensors 566 that may sense one or more of status and position of a latch; joint sensors 568 that may sense one or more of status, position, and load of a joint; actuator sensors 570 that may sense one or more of status, position, and load of an actuator; and lock sensors 582 that may sense one or more of status and position of a lock.

Sensors 564 may also include aircraft system sensors 584, and environment sensors 586. Aircraft system sensors 584 may sense one or more of a status or functionality of various aircraft systems that may include, a hydraulic system, an electrical system, wiring, a flight control system, wing fold controller 428, and/or control center 416. Without limitation, aircraft system sensors 584 may include a pitot or static system, a navigation system receiver, a thrust lever position, hydraulic pressure, hydraulic quantity, electrical voltage or current, and solenoid and/or a valve position. Without limitation, aircraft system sensors 584 may provide information to determine wind speed, and/or aircraft airspeed or ground speed.

Environment sensors 586 may include sensors that detect conditions present around and/or approaching aircraft 400. Conditions present around and/or approaching aircraft 400 may include, a physical location of aircraft 400, weather, a building, an airport structure, and any obstacle or vehicle around and/or approaching aircraft. Without limitation, environment sensors may include radar, an aircraft airground sensor, a Global Positioning System receiver, and/or an Automatic Dependent Surveillance-Broadcast (ADS-B) receiver.

Latches 572 may latch and secure wingtip 456 in flight position 510. Latches 572 may include locks 574 that may lock latches 572 in closed position 530 to secure latch 572 and wingtip 456 in flight position 510.

Actuators 576 may actuate various components of wing fold system 502. Actuators 576 may include a wingtip actuator that may transition wingtip 456 between flight position 510 and folded position 514. The wingtip actuator may move wingtip 456 by moving unfixed portion 454.

The wingtip actuator may include brake 580. Brake 580 may be any type of brake as may be known in the art for inhibiting motion of wingtip 456. Without limitation, brake 580 may be a pressure-off brake that may be spring biased and inhibit motion of wingtip actuator unless hydraulic pressure may be present on the brake. Thus, hydraulic power may be withheld from the wingtip actuator, and the brake may inhibit movement of the wingtip actuator while hydraulic pressure may be removed from components of wing fold system 502 such as but not limited to the wingtip actuator.

Brake 580 may provide redundancy to ensure that when wingtip position 508 may be in flight position 510 or in folded position 514, that actuator will not attempt to move wingtip 456 without a command. Brake 580 may provide redundancy to ensure that hydraulic fluid is not in a hydraulic actuator except when actuation of the actuator is commanded. Brake 580 may also be activated by wing fold controller 428 based on another status 504.

Actuators 576 may also include a latch actuator that may transition latches 572 between open position 526 and closed position 530. Actuators 576 may also include a lock actuator that may transition locks 574 of latches 572 between engaged position 540 and disengaged position 544.

Joints 578 may allow movement of wingtip 456 of a wing with respect to wing 442. Wingtip 456 of wing 442 may move, rotate, or fold with respect to wing 442 via joints 578. Joints 578 may be located on fixed portion 448 and/or unfixed portion 454 and may connect fixed portion 448 and unfixed portion 454.

Figure 6:
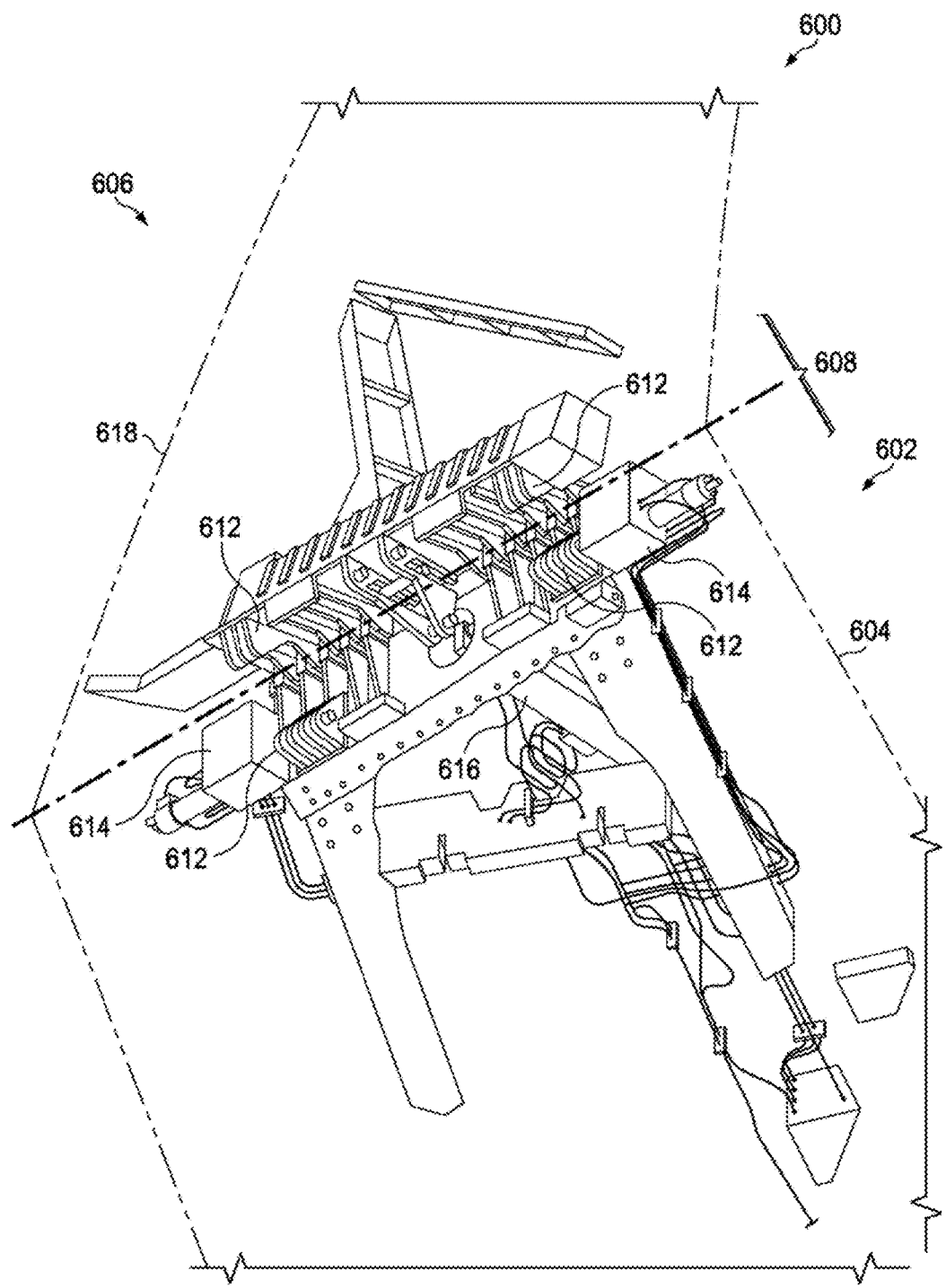
FIG. 6 is a diagram of a wing embodying a wing fold system in accordance with an illustrative embodiment.

FIG. 6 is a diagram of a wing embodying a wing fold system in accordance with an illustrative embodiment. FIG. 6 depicts a wing embodying a wing fold system controlled by a wing fold controller. Wing 602 may be an illustrative embodiment of wing 442 of aircraft 400 of FIG. 4 and wing 102/104 of aircraft 100 of FIG. 1. FIG. 6 depicts an underside of wing 602 in a folded position. Wing 602 may include fixed portion 604, unfixed portion 606, and wing fold system 608.

Fixed portion 604 may be an embodiment of fixed portion 124 of wing 102 and fixed portion 126 of wing 104 of FIG. 1 and FIG. 2. Fixed portion 604 may be an embodiment of fixed portion 448 of wing 442 of FIG. 4. Fixed portion 604 of wing 602 may include a wing box and moveable control surfaces (not shown).

Unfixed portion 606 may be an embodiment of unfixed portion 120 of wing 102, unfixed portion 122 of wing 104 of FIG. 1, and unfixed portion 454 of wing 442 of FIG. 4. Unfixed portion 606 may rotate with respect to fixed portion 604 of wing 602 between a flight position and a folded position. Unfixed portion 606 of wing 602 may include wingtip 618. Wingtip 618 may not include moveable control surfaces. In alternative embodiments, a control surface may be included in wingtip 618.

Wing fold system 608 may be an embodiment of a wing fold system of a wing of an aircraft, such as wing 102 and wing 104 of aircraft 100 of FIG. 1 and FIG. 2. Wing fold system 608 may be an embodiment of wing fold system 458 of wing 442 of aircraft 400 of FIG. 4. Wing fold system 608 may be an embodiment of wing fold system 502 of FIG. 5. Wing fold system 608 may move unfixed portion 606 with respect to fixed portion 604 in response to a wing fold controller, such as wing fold controller 428 of FIG. 4. Wing fold system 608 may include latches 612, locks 614, and actuator 616.

Latches 612 may latch and secure wingtip 618 in a flight position. Locks 614 may engage latches 612 when latches 612 may be in a closed position to prevent latches 612 from opening while wingtip 618 may be in flight position. Wingtip actuator 616 may actuate wingtip 618 to transition wingtip 618 between the flight position and a folded position.

Figure 7B:
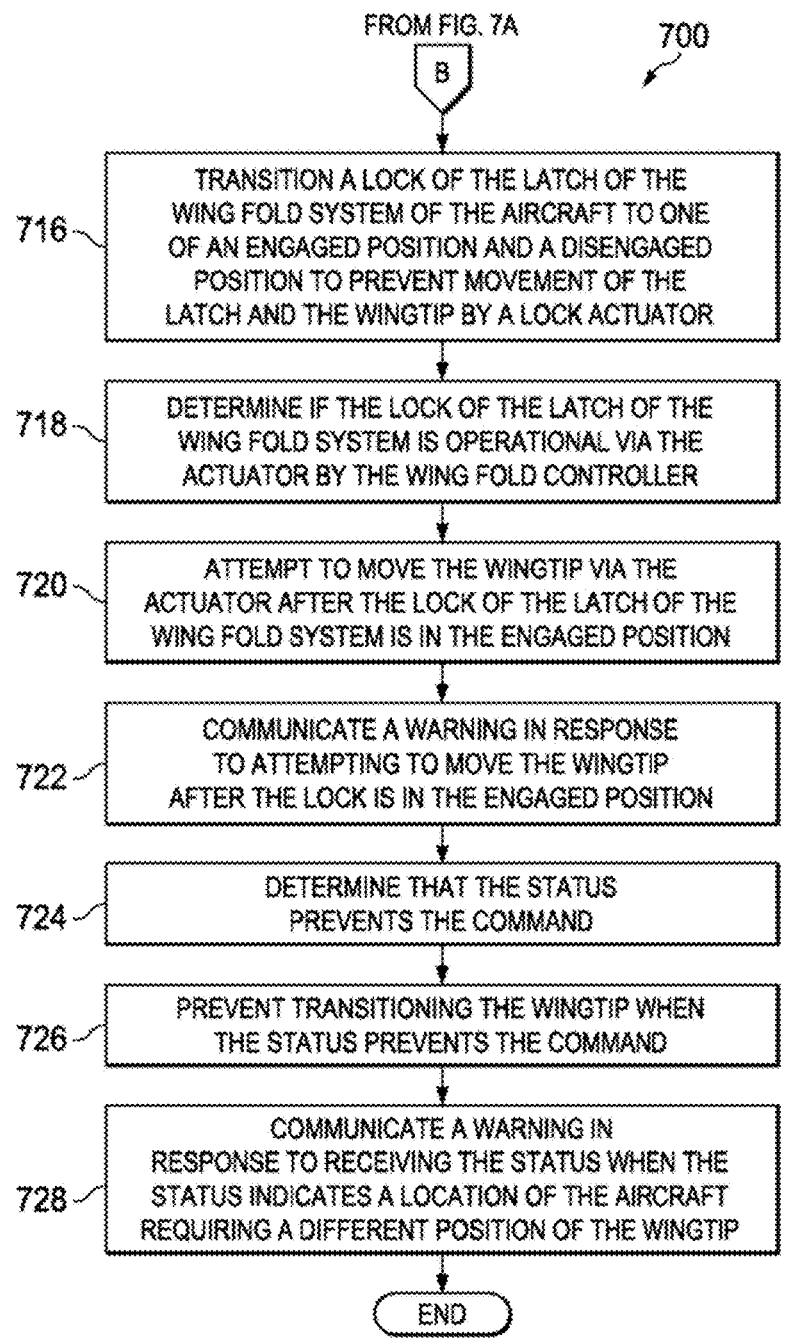

FIG. 7a and FIG. 7b are a flowchart of a method 700 of a wing fold controller in accordance with an illustrative embodiment. Method 700 shown in FIG. 7a and FIG. 7b may be implemented using aircraft 100 of FIG. 1 and FIG. 2. The process shown in FIG. 7a and FIG. 7b may be implemented by a processor, such as processor unit 1004 of FIG. 10. The process shown in FIG. 7a and FIG. 7b may be a variation of the processes shown in FIG. 1 through FIG. 6 and FIG. 8 through FIG. 10. Although the operations presented in FIG. 7a and FIG. 7b are described as being performed by a "process," the operations are being performed by at least one tangible processor or using one or more physical devices, as described elsewhere herein. The term "process" also may include computer instructions stored on a non-transitory computer readable storage medium.

Method 700 may begin as the process may receive a status of at least one of an aircraft and a wing fold system of the aircraft by the wing fold controller of the aircraft (operation 702). Next, the process may receive a command by the wing fold controller of the aircraft (operation 704). Next, the process may optionally generate the command as an automated command by the wing fold controller in response to receiving the status (operation 706)

A wing controller may generate an automated command to set a wing to a folded position when the status indicates the aircraft may be on or approaching a taxiway. A wing controller may generate an automated command to set the wing to the flight position when the status indicates the aircraft may be on a runway, such as without limitation after touchdown, or when using a runway to taxi the aircraft.

Based on an aircraft's location relative to a taxiway and/or a runway, a warning may be provided to the crew to change a position of a wingtip. Typically, the wingtip position may be changed while the aircraft may be on the ground. In a non-limiting example, an aircraft may have its wingtips in a folded position while at the gate, and in a flight position when approaching a runway for takeoff. A command to move the wingtip to the flight position may be automatically generated. The command to move the wingtip to the flight position may be based on the aircraft's position relative to the taxiway and/or the runway.

After aircraft 400 touchdown on landing, wingtip 456 may be folded. Command 430 to fold wingtip 456 may change the position of wingtip 456 based on the aircraft's position relative to the taxiway or the runway. Command 430 to fold wingtip 456 may be automatically generated.

Next, the process may operate the wing fold system of the aircraft based on the command and the status (operation 708). A wing fold controller may operate the wing fold system of the aircraft based on the command received in operation 704 and the status received in operation 702. Operation of the wing fold system by the wing fold controller may be via electrical, optical, mechanical, pneumatic, or hydraulic connections between the wing fold controller and the wing fold system and its various components.

Next, the process may transition a wingtip of a wing of the aircraft to one of a flight position of the wing and a folded position of the wing by an actuator of the wing fold system in response to operating the wing fold system (operation 710). Transitioning of the wingtip may take place by rotating or folding the wingtip at a joint shared by the wingtip and a fixed portion of the wing via the actuator. The actuator may be mechanically connected directly to the wingtip, or through a series of links and joints to establish the mechanical connection.

Next, the process may display the status of the wing fold system on a display (operation 712). The display may show any combination of the status received in operation 702, the command received in operation 704, and any other status related to a wing fold system.

Next, the process may transition a latch of the wing fold system of the aircraft to one of an open position and a closed position after the wingtip transitions to the flight position by a latch actuator (operation 714). The latch may secure the wingtip in the flight position so as to prevent movement of the wingtip during flight of the aircraft.

Next, the process may transition a lock of the latch of the wing fold system of the aircraft to one of an engaged position and a disengaged position to prevent movement of the latch and the wingtip by a lock actuator (operation 716). Next, the process may determine if the lock of the latch of the wing fold system may be operational via the actuator by the wing fold controller (operation 718). In so doing, the wing fold controller may cross check the functionality of components of a wing fold system.

Next, the process may attempt to move the wingtip via the actuator after the lock of the latch of the wing fold system may be in the engaged position (operation 720). If the lock and latch are working properly, the wingtip may not move. If either one or both of the lock and the latch are not working properly, the wingtip may move. Being able to move the wingtip after the lock and the latch are engaged indicates that the wing fold system may not be working properly.

Next, the process may communicate a warning in response to attempting to move the wingtip after the lock may be in the engaged position (operation 722). The warning may indicate that the aircraft may not be ready for flight and may be in need of maintenance.

Next, the process may determine that the status prevents the command (operation 724). When an aircraft may be in flight, the wing controller may determine that a command to fold a wingtip may be prevented by the aircraft's status of being in flight.

Next, the process may prevent transitioning the wingtip when the status prevents the command (operation 726). When an aircraft may be in flight, the wing controller may prevent executing a command to fold the wingtip since the aircraft may be in flight. Additionally, when the status would prevent the command, an indication of such may be given to a crew member on a display of the aircraft.

Next, the process may communicate a warning in response to receiving the status when the status indicates a location of the aircraft requiring a different position of the wingtip (operation 728). The warning may be communicated when the status indicates the wingtip may be in the flight position and the location indicates that the aircraft may be situated on or approaching a taxiway, a gate, or any location that may require the wingspan to be reduced. The warning may be communicated when the status indicates the wingtip may be in the folded position and the location indicates that the aircraft may be on a runway. Method 700 may terminate thereafter.

Figure 8:
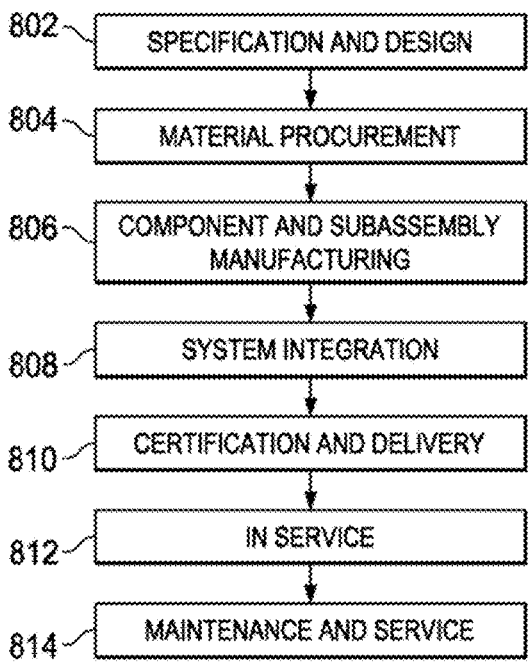
FIG. 8 is a flowchart of a method of manufacturing a commercial aircraft.
Figure 9:
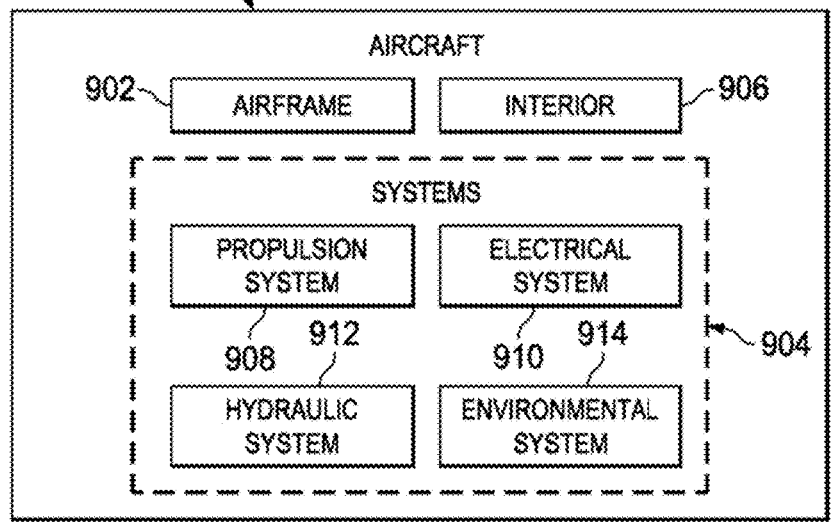
FIG. 9 is a block diagram of a commercial aircraft.

FIG. 8 is a flowchart of a method of manufacturing a commercial aircraft. Illustrative embodiments of the disclosure may be described in the context of aircraft manufacturing and service method 800 as depicted in FIG. 8 and aircraft 900 as shown in FIG. 9. Turning first to FIG. 8, an illustration of an aircraft manufacturing and service method is depicted in accordance with an illustrative embodiment. During pre-production, aircraft manufacturing and service method 800 may include specification and design 802 of aircraft 900 in FIG. 9 and material procurement 804.

During production, component and subassembly manufacturing 806 and system integration 808 of aircraft 900 in FIG. 9 takes place. Thereafter, aircraft 900 in FIG. 9 may go through certification and delivery 810 in order to be placed in service 812. While in service 812 by a customer, aircraft 900 in FIG. 9 may be scheduled for routine maintenance and service 814, which may include modification, reconfiguration, refurbishment, and other maintenance or service.

Each of the processes of aircraft manufacturing and service method 800 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

FIG. 9 is a block diagram of a commercial aircraft. Aircraft 900 may be produced by aircraft manufacturing and service method 800 in FIG. 8 and may include airframe 902 with plurality of systems 904 and interior 906. Examples of systems 904 include one or more of propulsion system 908, electrical system 910, hydraulic system 912, and environmental system 914. Any number of other systems may be included. Although an aerospace example is shown, different illustrative embodiments may be applied to other industries, such as the automotive industry.

Apparatuses and methods embodied herein may be employed during at least one of the stages of aircraft manufacturing or service method 800 in FIG. 8. In one illustrative example, components or subassemblies produced in component and subassembly manufacturing 806 in FIG. 8 may be fabricated or manufactured in a manner similar to components or subassemblies produced while aircraft 900 may be in service 812 in FIG. 8. As yet another example, one or more apparatus embodiments, method embodiments, or a combination thereof may be utilized during production stages, such as component and subassembly manufacturing 806 and system integration 808 in FIG. 8. One or more apparatus embodiments, method embodiments, or a combination thereof may be utilized while aircraft 900 may be in service 812 and/or during maintenance and service 814 in FIG. 8. The use of a number of the different illustrative embodiments may substantially expedite the assembly of and/or reduce the cost of aircraft 900.

FIG. 10 is an illustration of a data processing system, in accordance with an illustrative embodiment. Data processing system 1000 in FIG. 10 may be an example of a data processing system that may be used to implement the illustrative embodiments, such as aircraft 100 of FIG. 1 or FIG. 2, or any other module or system or process disclosed herein. In this illustrative example, data processing system 1000 includes communications fabric 1002, which provides communications between processor unit 1004, memory 1006, persistent storage 1008, communications unit 1010, input/output (I/O) unit 1012, and display 1014.

Processor unit 1004 serves to execute instructions for software that may be loaded into memory 1006. Processor unit 1004 may be a number of processors, a multi-processor core, or some other type of processor, depending on the particular implementation. A number, as used herein with reference to an item, means one or more items. Further, processor unit 1004 may be implemented using a number of heterogeneous processor systems in which a main processor may be present with secondary processors on a single chip. As another illustrative example, processor unit 1004 may be a symmetric multi-processor system containing multiple processors of the same type.

Memory 1006 and persistent storage 1008 may be embodiments of storage devices 1016. A storage device may be any piece of hardware that may be capable of storing information, such as, for example, without limitation, data, program code in functional form, and/or other suitable information either on a temporary basis and/or a permanent basis. Storage devices 1016 may also be referred to as computer readable storage devices in these examples. Memory 1006, in these examples, may be, for example, a random access memory or any other suitable volatile or non-volatile storage device. Persistent storage 1008 may take various forms, depending on the particular implementation.

For example, persistent storage 1008 may contain one or more components or devices. For example, persistent storage 1008 may be a hard drive, a flash memory, a rewritable optical disk, a rewritable magnetic tape, or some combination of the above. The media used by persistent storage 1008 also may be removable. For example, a removable hard drive may be used for persistent storage 1008.

Communications unit 1010, in these examples, may provide for communications with other data processing systems or devices. In these examples, communications unit 1010 may be a network interface card. Communications unit 1010 may provide communications through the use of either or both physical and wireless communications links.

Input/output (I/O) unit 1012 may allow for input and output of data with other devices that may be connected to data processing system 1000. Without limitation, input/output (I/O) unit 1012 may provide a connection for user input through a keyboard, a mouse, a processor, lever, or switch that may be in a control center that may be in a cockpit or in a maintenance facility, and/or some other suitable input device. Further, input/output (I/O) unit 1012 may send output to a printer. Display 1014 may provide a mechanism to display information to a user.

Instructions for the operating system, applications, and/or programs may be located in storage devices 1016, which are in communication with processor unit 1004 through communications fabric 1002. In these illustrative examples, the instructions are in a functional form on persistent storage 1008. These instructions may be loaded into memory 1006 for execution by processor unit 1004. The processes of the different embodiments may be performed by processor unit 1004 using computer implemented instructions, which may be located in a memory, such as memory 1006.

These instructions are referred to as program code, computer usable program code, or computer readable program code that may be read and executed by a processor in processor unit 1004. The program code in the different embodiments may be embodied on different physical or computer readable storage media, such as memory 1006 or persistent storage 1008.

Program code 1018 may be located in a functional form on computer readable media 1020 that may be selectively removable and may be loaded onto or transferred to data processing system 1000 for execution by processor unit 1004. Program code 1018 and computer readable media 1020 form computer program product 1022 in these examples. In one example, computer readable media 1020 may be computer readable storage media 1024 or computer readable signal media 1026. Computer readable storage media 1024 may include, for example, an optical or magnetic disk that may be inserted or placed into a drive or other device that may be part of persistent storage 1008 for transfer onto a storage device, such as a hard drive, that may be part of persistent storage 1008. Computer readable storage media 1024 also may take the form of a persistent storage, such as a hard drive, a thumb drive, or a flash memory, that may be connected to data processing system 1000. In some instances, computer readable storage media 1024 may not be removable from data processing system 1000.

Alternatively, program code 1018 may be transferred to data processing system 1000 using computer readable signal media 1026. Computer readable signal media 1026 may be, for example, a propagated data signal containing program code 1018. For example, computer readable signal media 1026 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 1018 may be downloaded over a network to persistent storage 1008 from another device or data processing system through computer readable signal media 1026 for use within data processing system 1000. For instance, program code stored in a computer readable storage medium in a server data processing system may be downloaded over a network from the server to data processing system 1000. The data processing system providing program code 1018 may be a server computer, a client computer, or some other device capable of storing and transmitting program code 1018.

The different components illustrated for data processing system 1000 are not meant to provide architectural limitations to the manner in which different embodiments may be implemented. The different illustrative embodiments may be implemented in a data processing system including components in addition to or in place of those illustrated for data processing system 1000. Other components shown in FIG. 10 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 1004 may take the form of a hardware unit that has circuits that are manufactured or configured for a particular use. This type of hardware may perform operations without needing program code to be loaded into a memory from a storage device to be configured to perform the operations.

For example, when processor unit 1004 takes the form of a hardware unit, processor unit 1004 may be a circuit system, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 1018 may be omitted because the processes for the different embodiments are implemented in a hardware unit.

In still another illustrative example, processor unit 1004 may be implemented using a combination of processors found in computers and hardware units. Processor unit 1004 may have a number of hardware units and a number of processors that are configured to run program code 1018. With this depicted example, some of the processes may be implemented in the number of hardware units, while other processes may be implemented in the number of processors.

As another example, a storage device in data processing system 1000 may be any hardware apparatus that may store data. Memory 1006, persistent storage 1008, and computer readable media 1020 are examples of storage devices in a tangible form.

In another example, a bus system may be used to implement communications fabric 1002 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 1006, or a cache, such as found in an interface and memory controller hub that may be present in communications fabric 1002.

Data processing system 1000 may also include at least one associative memory (not shown in FIG. 10). Associative memory may be in communication with communications fabric 1002. Associative memory may also be in communication with, or in some illustrative embodiments, be considered part of storage devices 1016. The different illustrative embodiments can take the form of an entirely hardware embodiment, an entirely software embodiment, or an embodiment containing both hardware and software elements. Some embodiments are implemented in software, which includes but may be not limited to forms, such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or usable program code such that when the computer readable or usable program code may be executed on a computer, the execution of this computer readable or usable program code causes the computer to transmit another computer readable or usable program code over a communications link. This communications link may use a medium that may be, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples of modems and network adapters are just a few of the currently available types of communications adapters.

The flowcharts and block diagrams in the different depicted illustrative embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description, and may be not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of controlling folding of a wing, the method comprising:
   receiving, in a wing fold controller, a status of at least one of: an aircraft, and a wing fold system, such that the aircraft comprises the wing fold controller and the wing fold system;
   receiving, in the wing fold controller, a command in response to receiving the status;
   operating the wing fold system, using the wing fold controller, based on the command and the status of at least one of: the aircraft, and the wing fold system;
   checking for a presence of a latent anomaly in the wing fold system via a periodic automated system test by the wing fold controller sending an automated command to move a wingtip with a lock of the wing fold system in an engaged position; and
   a control center in the aircraft communicating a warning responsive to the wing fold controller discovering the latent anomaly.

2. The method of claim 1, further comprising the command directing the wing to one of:
   with the status indicating the aircraft is on a taxiway, to a folded position; and
   with the status indicating the aircraft is on a runway, to a flight position.

3. The method of claim 1, further comprising:
   the automated system test verifying the wingtip is latched to a fixed portion of the wing and that a latch latching the wingtip to the fixed portion of the wing is locked; and
   displaying the status of the wing fold system on a display.

4. The method of claim 1, further comprising checking for the presence of the latent anomaly comprising using a status of a latch in the wing fold system and a status of a lock on the latch in the wing fold system.

5. The method of claim 1, further comprising the periodic automated system test comprising: determining, via the wing fold controller, whether the status prevents the command; and at least one of:
   transitioning, via a wingtip actuator, the wingtip of the wing to one of: a flight position of the wing, and a folded position of the wing, in response to the command; and
   preventing, via the wing fold controller, the wingtip actuator from transitioning the wingtip when the status prevents the command.

6. The method of claim 1, further comprising:
   transitioning, via a latch actuator, a latch of the wing fold system of the aircraft to one of an open position and a closed position after the wingtip transitions to a flight position.

7. The method of claim 6, further comprising:
   transitioning, via a lock actuator, the lock of the latch of the wing fold system of the aircraft to one of: the engaged position, and a disengaged position that prevents movement of: the latch, and the wingtip.

8. The method of claim 1, further comprising:
communicating another warning in response to receiving the status, when the status indicates that a location of the aircraft requires a different position of the wingtip.

9. The method of claim 8, further comprising the status indicating the wingtip being in at least one of:
a flight position with the location of the aircraft being at least one of: on a taxiway, and at a gate; and
a folded position with the location of the aircraft being on a runway.

10. An apparatus configured to control a wing fold system of a wing of an aircraft, such that the apparatus comprises:
a wing fold controller configured to:
receive a status of at least one of: the aircraft, and the wing fold system of the aircraft;
discover, based upon a periodic automated system test by the wing fold controller that sends an automated command to move a wingtip with a lock of the wing fold system in an engaged position, a latent anomaly in the wing fold system;
communicate, via a control center in the aircraft, a warning in response to a discovery of the latent anomaly in the wing fold system;
receive a command based on receiving the status; and
operate the wing fold system of the aircraft based on the command and the status; and
a wingtip actuator configured to transition, in response to the wing fold controller, the wingtip of the wing of the aircraft to one of: a flight position and a folded position.

11. The apparatus of claim 10, wherein the status indicates at least one of:
that the aircraft is at least one of: on a taxiway, and rolling toward the taxiway, and the command directs the wing to the folded position; and
the aircraft is at least one of: on a runway, and rolling toward the runway, and the command directs the wing to the flight position.

12. The apparatus of claim 10, further comprising:
a display configured to display the status of the wing fold system; and
the status of the wing fold system comprising:
a status of a latch comprising a first status for any: actuator, wiring, hydraulic power, electric power, or sensor, associated with the latch; and
a status of a lock on the latch comprising a second status for any: actuator, wiring, hydraulic power, electric power, or sensor, associated with the lock.

13. The apparatus of claim 10, further comprising the periodic automated system test verifying a status of each latch in the wing fold system and a status of each lock on each latch in the wing fold system.

14. The apparatus of claim 10, further comprising:
the wing fold controller configured to: determine that the status prevents the command, and prevent transitioning the wingtip when the status prevents the command.

15. The apparatus of claim 10, further comprising:
a latch actuator configured to transition a latch of the wing fold system of the aircraft to one of: an open position, and a closed position, after the wingtip transitions to the flight position; and
a lock actuator configured to transition the lock to one of: the engaged position, and a disengaged position, and prevent movement of the latch and the wingtip.

16. The apparatus of claim 10, further comprising:
the wing fold controller configured to communicate, when the status indicates that a location of the aircraft requires a different position of the wingtip, another warning in response to receiving the status, and the status indicates at least one of:
that the wingtip is in the flight position, and that the aircraft is one of: on a taxiway, at a gate, approaching any obstacle or vehicle that the wing fold controller predicts to contact the wingtip, and approaching the taxiway; and
that the wingtip is in the folded position and at least one of: on a runway, and rolling toward the runway.

17. An aircraft that comprises:
a computer, that comprises: a bus, a processor connected to the bus, and a memory connected to the bus, the memory configured to store a program code configured to perform, via the processor, a computer-implemented method, the program code comprising:
program code configured to receive a status of at least one of: the aircraft, and a wing fold system of the aircraft, by a wing fold controller of the aircraft;
program code configured to receive a command, by the wing fold controller of the aircraft, in response to receiving the status;
program code configured to determine, via the processor and the wing fold controller, an operational status of a lock of the wing fold system;
program code configured to issue a periodic automated system test that sends an automated command to move a wingtip of a wing of the aircraft, via the processor, with the lock of the wing fold system in an engaged position;
program code configured to communicate a warning, responsive to the periodic automated system test, via the processor, with the lock in the engaged position, based upon a determination by at least one lock sensor of at least one of: the status, and a position of the lock;
program code configured to operate the wing fold system of the aircraft, via the processor and the wing fold controller, based on the command and the status; and
program code configured to transition the wingtip to one of: a flight position and a folded position via the processor and a wingtip actuator of the wing fold system.

18. The aircraft of claim 17, further comprising wherein the status indicates at least one of:
the aircraft being at least one of: on a taxiway, and rolling toward the taxiway, and the command directs the wing to the folded position; and
the aircraft being at least one of: on a runway, and rolling toward the runway, and the command directs the wing to the flight position.

19. The aircraft of claim 17, further comprising:
the periodic automated system test checking for a latent anomaly with at least one of:
a status of a latch that comprises a first status for any: actuator, wiring, hydraulic power, electric power, and sensor, associated with the latch; and
the status of the lock on the latch that comprises a second status for any: actuator, wiring, hydraulic power, electric power, and sensor, associated with the lock.

20. The aircraft of claim 17, further comprising:
program code configured to, using the processor, determine that the status prevents the command; and program code configured to, using the processor, prevent transitioning the wingtip when the status prevents the command.

* * * * *